United States Patent
Oota et al.

(10) Patent No.: US 10,252,495 B2
(45) Date of Patent: Apr. 9, 2019

(54) INTERMEDIATE FILM FOR LAMINATED GLASS, AND LAMINATED GLASS

(71) Applicant: SEKISUI CHEMICAL CO., LTD., Osaka, Osaka (JP)

(72) Inventors: Yuusuke Oota, Kouka (JP); Ryuta Tsunoda, Kouka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 15/509,129

(22) PCT Filed: Sep. 28, 2015

(86) PCT No.: PCT/JP2015/077348
§ 371 (c)(1),
(2) Date: Mar. 6, 2017

(87) PCT Pub. No.: WO2016/052422
PCT Pub. Date: Apr. 7, 2016

(65) Prior Publication Data
US 2017/0274630 A1 Sep. 28, 2017

(30) Foreign Application Priority Data

Sep. 29, 2014 (JP) ................................. 2014-198475
Sep. 30, 2014 (JP) ................................. 2014-202610

(51) Int. Cl.
*F21V 9/06* (2018.01)
*G02B 5/20* (2006.01)
(Continued)

(52) U.S. Cl.
CPC .. *B32B 17/10605* (2013.01); *B32B 17/10568* (2013.01); *B32B 17/10633* (2013.01);
(Continued)

(58) Field of Classification Search
CPC C08K 2003/2258; C08K 3/22; C08K 5/0041; C08K 3/08; C08K 5/3475
(Continued)

(56) References Cited

U.S. PATENT DOCUMENTS

| 6,673,456 B1 | 1/2004 | Kobata et al. |
| 2002/0054993 A1* | 5/2002 | Nagai ............... B32B 17/10036 428/328 |

(Continued)

FOREIGN PATENT DOCUMENTS

| CN | 101410341 A | 4/2009 |
| CN | 102256910 A | 11/2011 |

(Continued)

OTHER PUBLICATIONS

Written Opinion of the International Searching Authority (PCT/ISA/237) for Application No. PCT/JP2015/077348 dated Dec. 22, 2015 (English Translation mailed Apr. 13, 2017).
(Continued)

*Primary Examiner* — Brandi N Thomas
(74) *Attorney, Agent, or Firm* — Cheng Law Group, PLLC

(57) ABSTRACT

There is provided an interlayer film for laminated glass with which a low yellow index value, low excitation purity and high heat shielding properties can be achieved in spite of the thickness varying with places. The interlayer film for laminated glass according to the present invention has a thickness of one end thinner than a thickness of the other end at the opposite side of the one end and includes a thermoplastic resin, an ultraviolet ray screening agent and tungsten oxide particles, and the ultraviolet ray screening agent is a benzotriazole-based ultraviolet ray screening agent.

4 Claims, 4 Drawing Sheets

(51) Int. Cl.
  *G02F 1/153* (2006.01)
  *B32B 17/10* (2006.01)
  *B32B 27/18* (2006.01)
  *B32B 27/30* (2006.01)
  *B60J 1/00* (2006.01)
  *B60J 1/02* (2006.01)
  *C01G 41/02* (2006.01)
  *C08K 3/08* (2006.01)
  *C08K 3/22* (2006.01)
  *C08K 5/00* (2006.01)
  *C08L 29/14* (2006.01)

(52) U.S. Cl.
  CPC .. *B32B 17/10651* (2013.01); *B32B 17/10678* (2013.01); *B32B 17/10761* (2013.01); *B32B 27/18* (2013.01); *B32B 27/30* (2013.01); *B60J 1/00* (2013.01); *B60J 1/02* (2013.01); *C01G 41/02* (2013.01); *C08K 3/08* (2013.01); *C08K 3/22* (2013.01); *C08K 5/0041* (2013.01); *C08L 29/14* (2013.01); *B32B 2307/306* (2013.01); *B32B 2605/006* (2013.01); *C08K 2003/2258* (2013.01)

(58) Field of Classification Search
  USPC ................ 359/237, 350, 361, 343, 609, 275
  See application file for complete search history.

(56) References Cited

U.S. PATENT DOCUMENTS

| | | |
|---|---|---|
| 2005/0181220 A1 | 8/2005 | Kobata et al. |
| 2006/0008640 A1 | 1/2006 | Chonan et al. |
| 2006/0210776 A1 | 9/2006 | Lu et al. |
| 2007/0148472 A1 | 6/2007 | Masaki et al. |
| 2009/0294212 A1 | 12/2009 | Miyai |
| 2010/0233453 A1 | 9/2010 | Hashimoto |
| 2011/0076459 A1 | 3/2011 | Lu et al. |
| 2011/0094825 A1 | 4/2011 | Miyai |
| 2012/0003428 A1 | 1/2012 | Miyai |
| 2012/0021230 A1 | 1/2012 | Fukatani et al. |
| 2012/0162752 A1 | 6/2012 | Kitano et al. |
| 2012/0164457 A1 | 6/2012 | Fukatani et al. |
| 2013/0131233 A1 | 5/2013 | Fukatani et al. |
| 2013/0149503 A1 | 6/2013 | Yamamoto et al. |
| 2013/0194659 A1 | 8/2013 | Hatta et al. |
| 2013/0323517 A1 | 12/2013 | Kitano et al. |
| 2014/0178651 A1 | 6/2014 | Miyai |
| 2014/0193646 A1 | 7/2014 | Kitano et al. |
| 2014/0377567 A1 | 12/2014 | Ii et al. |
| 2015/0258747 A1 | 9/2015 | Miyai |

FOREIGN PATENT DOCUMENTS

| | | | | |
|---|---|---|---|---|
| CN | 103080037 A | | 5/2013 | |
| CN | 103391907 A | | 11/2013 | |
| CN | 103693864 A | | 4/2014 | |
| CN | 103889917 A | | 6/2014 | |
| EP | 2 017 237 A1 | | 1/2009 | |
| EP | 2 173 551 B1 | | 3/2011 | |
| EP | 2 607 328 A1 | | 6/2013 | |
| EP | 2 650 266 A1 | | 10/2013 | |
| EP | 2 674 405 A1 | | 12/2013 | |
| EP | 2 679 558 A1 | | 1/2014 | |
| JP | 4-502525 A | | 5/1992 | |
| JP | 2007-223883 A | | 9/2007 | |
| JP | 2008-532917 A | | 8/2008 | |
| JP | 2013-001613 | * | 6/2011 | ............. C03C 27/12 |
| JP | 2013-224257 | * | 5/2013 | ............. C03C 27/12 |
| WO | WO-91/06031 A1 | | 5/1991 | |
| WO | WO-01/25162 A1 | | 4/2001 | |
| WO | WO-2095/087680 A1 | | 9/2005 | |
| WO | WO-2007/132777 A1 | | 11/2007 | |
| WO | WO 2012/023616 A1 | | 2/2012 | |
| WO | WO 2012/115197 A1 | | 8/2012 | |

OTHER PUBLICATIONS

Written Opinion of the International Searching Authority (PCT/ISA/237) for Application No. PCT/JP2015/077347 dated Dec. 22, 2015 (English Translation mailed Apr. 13, 2017).
International Search Report for the Application No. PCT/JP2015/077348 dated Dec. 22, 2015.
Written Opinion of the International Searching Authority (PCT/ISA/237) for Application No. PCT/JP2015/077348 dated Dec. 22, 2015.
International Search Report for the Application No. PCT/JP2015/077347 dated Dec. 22, 2015.
Written Opinion of the International Searching Authority (PCT/ISA/237) for Application No. PCT/JP2015/077347 dated Dec. 22, 2015.
Supplementary European Search Report for the Application No. EP 15 846 965.0 dated Mar. 22, 2018.
Supplementary European Search Report for the Application No. EP 15 846 128.5 dated Apr. 4, 2018.
Final Office Action for the U.S. Appl. No. 15/509,057 from the United States Patent and Trademark Office dated Jun. 4, 2018.
Non-Final Office Action for the U.S. Appl. No. 15/509,057 from the United States Patent and Trademark Office dated Oct. 6, 2017.
The First Office Action for the Application No. 201580045737.8 from The State Intellectual Property Office of the People's Republic of China dated Oct. 31, 2018.
The First Office Action for the Application No. 201580050267.4 from The State Intellectual Property Office of the People's Republic of China dated Jan. 3, 2019.

* cited by examiner

[FIG. 1]
(a)
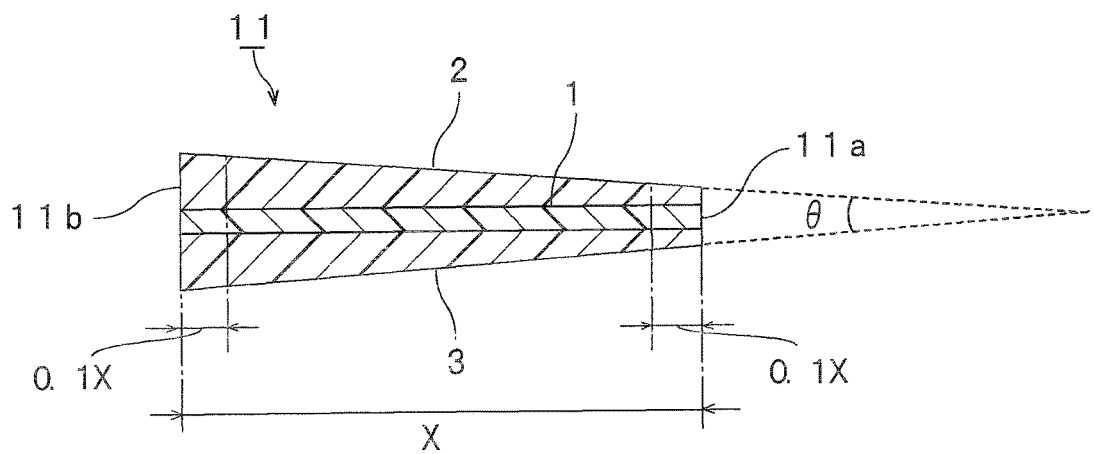
(b)
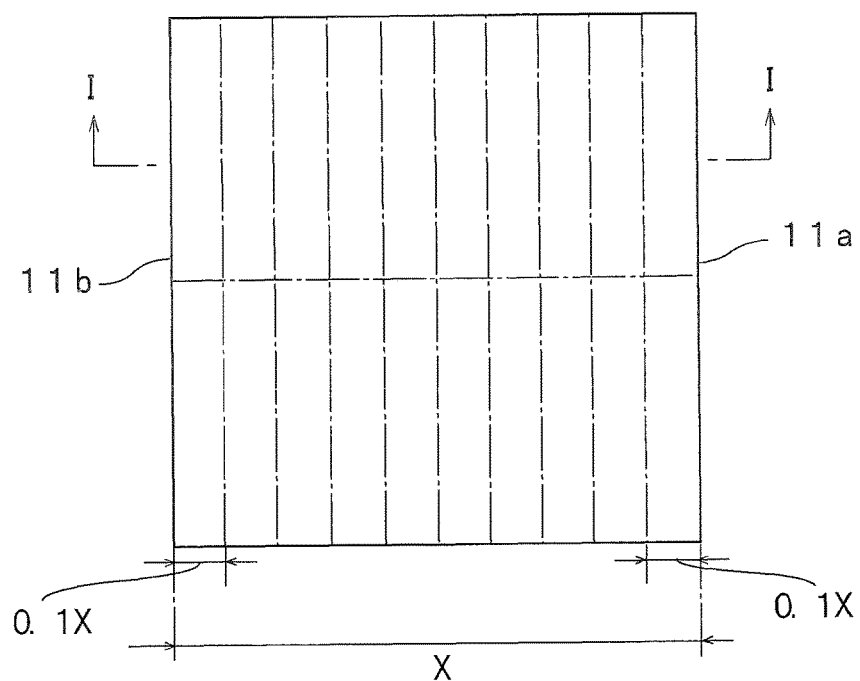

[FIG. 2]
(a)
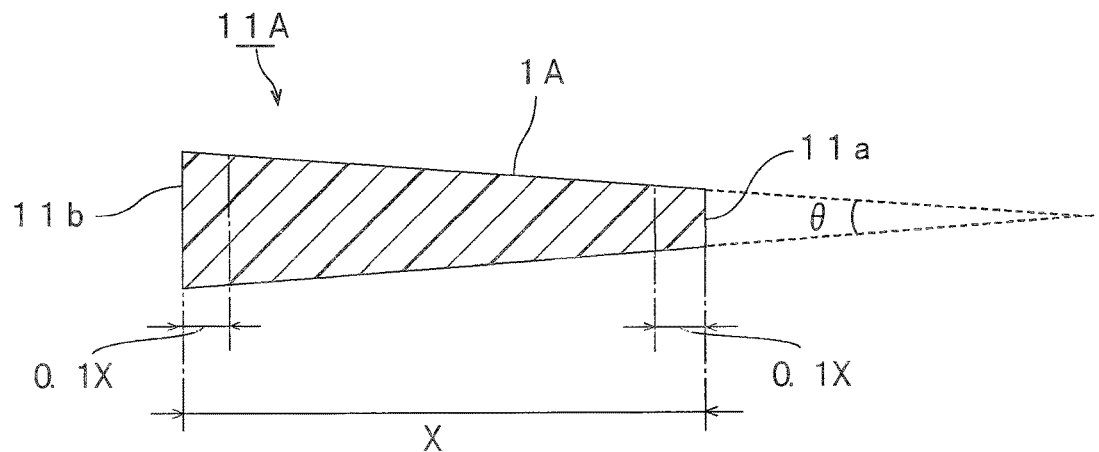
(b)
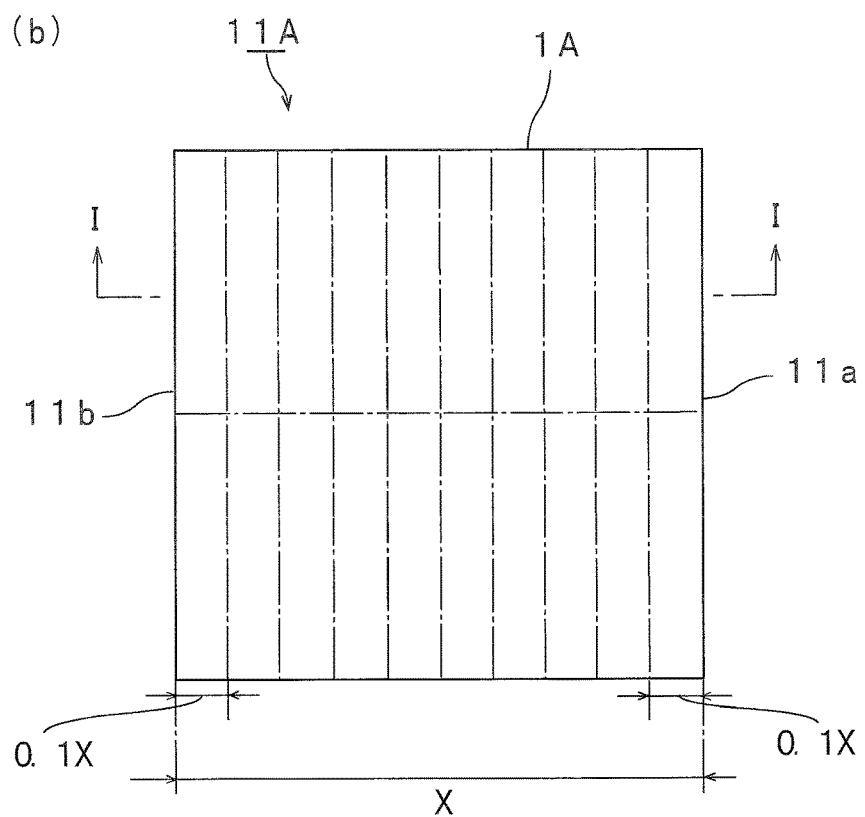

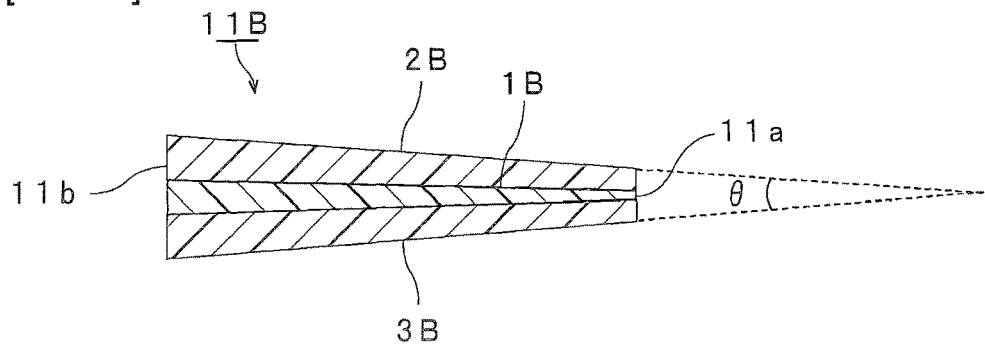
[FIG. 3]
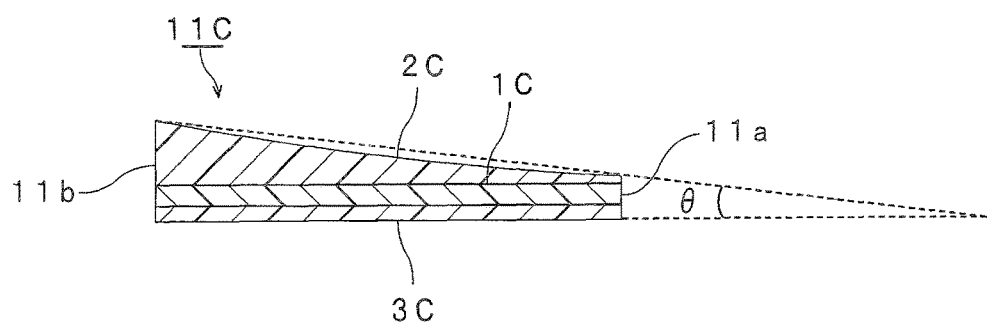
[FIG. 4]
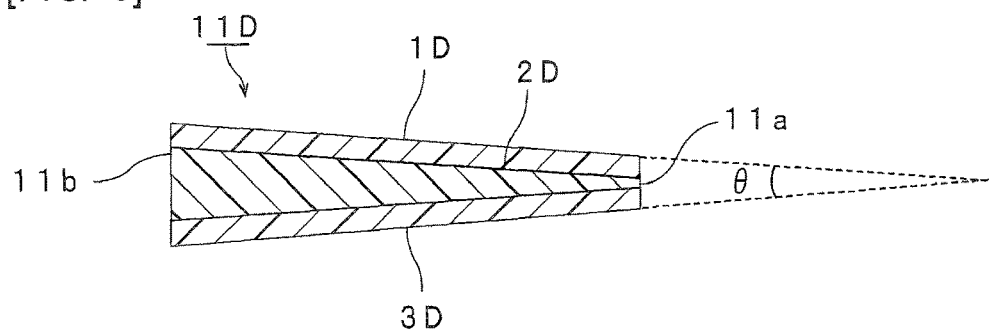
[FIG. 5]
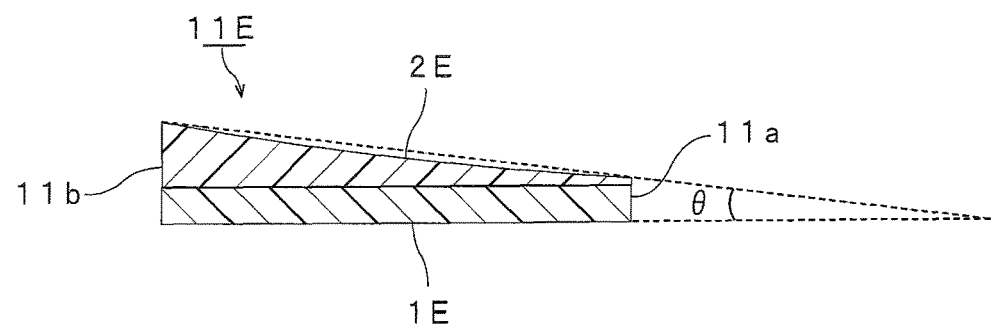
[FIG. 6]

[FIG. 7]
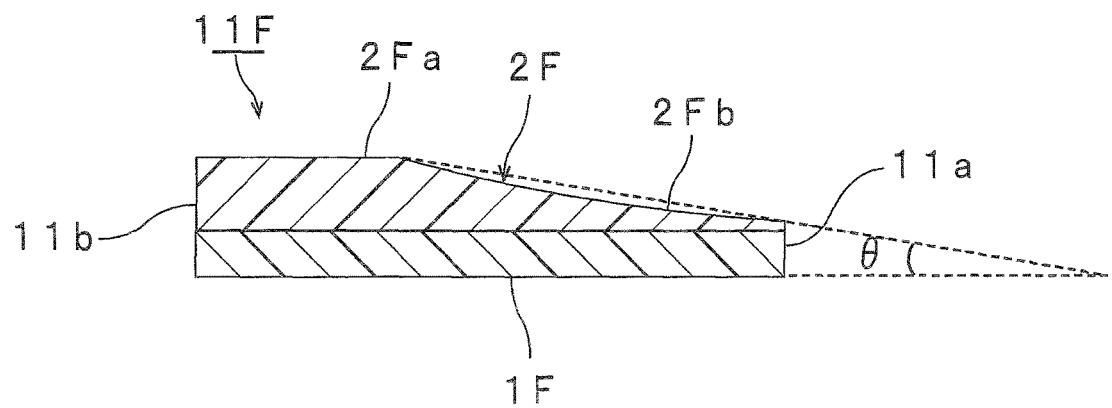
[FIG. 8]
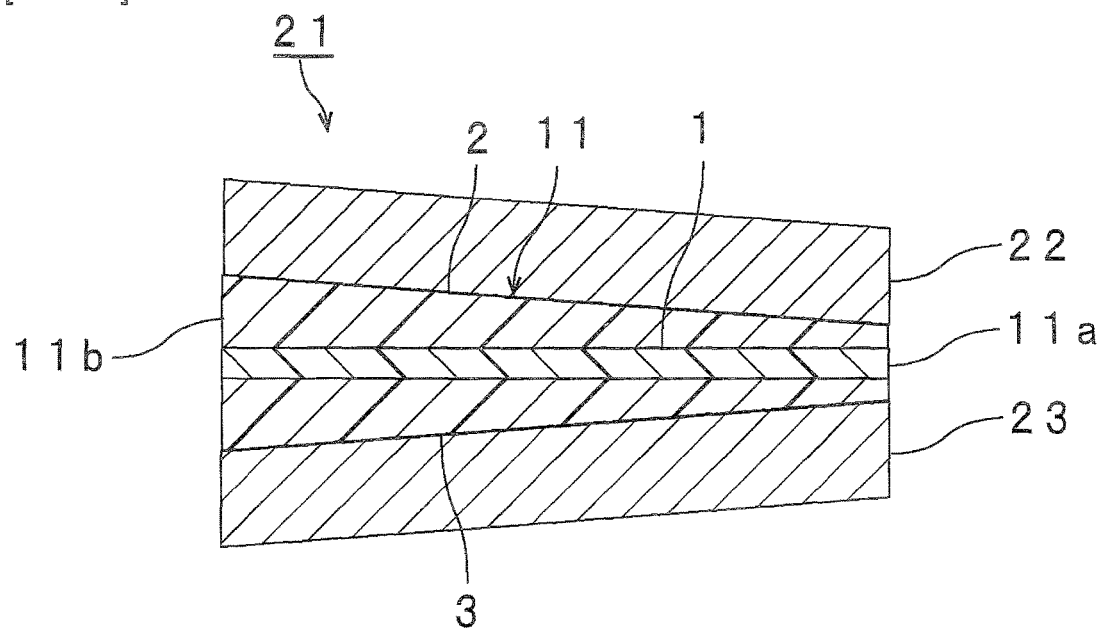

INTERMEDIATE FILM FOR LAMINATED GLASS, AND LAMINATED GLASS

TECHNICAL FIELD

The present invention relates to an interlayer film for laminated glass which is used for obtaining laminated glass. Moreover, the present invention relates to laminated glass prepared with the interlayer film for laminated glass.

BACKGROUND ART

Since laminated glass generates only a small amount of scattering glass fragments even when subjected to external impact and broken, laminated glass is excellent in safety. As such, the laminated glass is widely used for automobiles, railway vehicles, aircraft, ships, buildings and the like. The laminated glass is produced by sandwiching an interlayer film for laminated glass between a pair of two glass plates.

As the laminated glass used for automobiles, a head-up display (HUD) has been known. In the HUD, on the windshield of an automobile, measured information such as the speed which is traveling data of the automobile and the like can be displayed.

In the HUD, there is a problem that the measured information displayed on the windshield is doubly observed.

In order to suppress double images, the following Patent Document 1 discloses a sheet of laminated glass in which a wedge-shaped interlayer film having a prescribed wedge angle is sandwiched between a pair of glass plates. In such a sheet of laminated glass, by the adjustment of the wedge angle of the interlayer film, a display of measured information reflected by one glass plate and a display of measured information reflected by the other glass plate can be focused into one point to make an image in the visual field of a driver. As such, the display of measured information is hardly observed doubly and the visibility of a driver is not hindered.

Moreover, laminated glass used for the opening part of vehicles and buildings is required to have high heat shielding properties.

The energy amount of an infrared ray with a wavelength of 730 nm or more which is longer than that of visible light is small as compared with that of an ultraviolet ray. However, the thermal action of infrared rays is large, and when infrared rays are absorbed into a substance, heat is released from the substance. As such, infrared rays are generally called heat rays. Accordingly, in order to heighten the heat shielding properties of laminated glass, it is necessary to sufficiently cut off infrared rays.

As an interlayer film including heat shielding particles for effectively cutting off the infrared rays (heat rays), the following Patent Document 2 discloses an interlayer film including tin-doped indium oxide particles (ITO particles) or antimony-doped tin oxide particles (ATO particles). The following Patent Document 3 discloses an interlayer film including tungsten oxide particles.

RELATED ART DOCUMENT

Patent Document

Patent Document 1: JP 04-502525 T
Patent Document 2: WO 2001/025162 A1
Patent Document 3: WO 2005/087680 A1

SUMMARY OF THE INVENTION

Problems to be Solved by the Invention

There are cases where a sheet of laminated glass prepared with a conventional interlayer film is high in the yellow index value (YI value). Moreover, there are cases where a sheet of laminated glass prepared with a conventional interlayer film is high in excitation purity. Furthermore, in a sheet of laminated glass prepared with a conventional interlayer film, sufficient heat shielding properties are not attained particularly when a heat shielding compound such as heat shielding particles is not used.

In this connection, with regard to a wedge-shaped interlayer film, the thickness of the interlayer film varies with places. As such, both in a part being thick in thickness of the interlayer film and in a part being thin in thickness thereof, it is preferred that the YI value be low and it is preferred that the excitation purity be low. Moreover, between a part being thick in thickness of the interlayer film and a part being thin in thickness thereof, it is preferred that the difference in the YI value be small and it is preferred that the difference in the excitation purity be small.

Moreover, in recent years, with diversification of designs of the vehicle type and diversification of fitting angles of laminated glass, in a wedge-shaped interlayer film, there are cases where the wedge angle is set to a larger value. In an interlayer film having a large wedge angle, the YI value is partially liable to become high and the excitation purity is partially liable to become high. In an interlayer film having a large wedge angle, problems about the YI value and the excitation purity are liable to be significantly caused.

An object of the present invention is to provide an interlayer film for laminated glass with which a low yellow index value, low excitation purity and high heat shielding properties can be achieved in spite of the thickness varying with places. Moreover, the present invention is also aimed at providing laminated glass prepared with the interlayer film for laminated glass.

Means for Solving the Problems

According to a broad aspect of the present invention, there is provided an interlayer film for laminated glass having a thickness of one end thinner than a thickness of the other end at the opposite side of the one end and including a thermoplastic resin, an ultraviolet ray screening agent and tungsten oxide particles, the ultraviolet ray screening agent being a benzotriazole-based ultraviolet ray screening agent.

In a specific aspect of the interlayer film for laminated glass according to the present invention, when the distance between the one end and the other end of the interlayer film is defined as X, the excitation purity at a point positioned at a distance of 0.1X from the other end toward the inside is 2.6 or less.

In a specific aspect of the interlayer film for laminated glass according to the present invention, when the distance between the one end and the other end of the interlayer film is defined as X, the absolute value of the difference between the excitation purity at a point positioned at a distance of 0.1X from the other end toward the inside and the excitation purity at a point positioned at a distance of 0.1X from the one end toward the inside is 1 or less.

It is preferred that the thermoplastic resin contained in the first layer be a polyvinyl acetal resin. It is preferred that the first layer contain a plasticizer. It is preferred that the thermoplastic resin contained in the second layer be a polyvinyl acetal resin. It is preferred that the second layer contain a plasticizer.

In a specific aspect of the interlayer film for laminated glass according to the present invention, the interlayer film further has a portion in which the sectional shape in the thickness direction is a wedge-like shape.

According to a broad aspect of the present invention, there is provided laminated glass including a first laminated glass member, a second laminated glass member and the interlayer film for laminated glass described above, the interlayer film for laminated glass being arranged between the first laminated glass member and the second laminated glass member.

Effect of the Invention

Since the interlayer film for laminated glass according to the present invention has a thickness of one end thinner than a thickness of the other end at the opposite side of the one end and includes a thermoplastic resin, an ultraviolet ray screening agent and tungsten oxide particles, and the ultraviolet ray screening agent is a benzotriazole-based ultraviolet ray screening agent, a low yellow index value, low excitation purity and high heat shielding properties can be achieved in spite of the thickness varying with places.

BRIEF DESCRIPTION OF DRAWINGS

FIGS. 1(a) and 1(b) are a sectional view and a plan view schematically showing an interlayer film for laminated glass in accordance with a first embodiment of the present invention.

FIGS. 2(a) and 2(b) are a sectional view and a plan view schematically showing an interlayer film for laminated glass in accordance with a second embodiment of the present invention.

FIG. 3 is a sectional view showing a first modified example of a sectional shape in the thickness direction of an interlayer film for laminated glass.

FIG. 4 is a sectional view showing a second modified example of a sectional shape in the thickness direction of an interlayer film for laminated glass.

FIG. 5 is a sectional view showing a third modified example of a sectional shape in the thickness direction of an interlayer film for laminated glass.

FIG. 6 is a sectional view showing a fourth modified example of a sectional shape in the thickness direction of an interlayer film for laminated glass.

FIG. 7 is a sectional view showing a fifth modified example of a sectional shape in the thickness direction of an interlayer film for laminated glass.

FIG. 8 is a sectional view showing an example of laminated glass prepared with the interlayer film for laminated glass shown in FIG. 1.

MODE(S) FOR CARRYING OUT THE INVENTION

Hereinafter, the details of the present invention will be described.

An interlayer film for laminated glass (in the present specification, sometimes abbreviated as an "interlayer film") according to the present invention has a one-layer structure or a two or more-layer structure. The thickness of one end of the interlayer film according to the present invention is thinner than the thickness of the other end at the opposite side of the one end. The interlayer film according to the present invention is provided with a first layer containing a thermoplastic resin and a second layer containing a thermoplastic resin. The interlayer film according to the present invention includes a thermoplastic resin, an ultraviolet ray screening agent and tungsten oxide particles. In the interlayer film according to the present invention, the ultraviolet ray screening agent is a benzotriazole-based ultraviolet ray screening agent.

Since the interlayer film for laminated glass according to the present invention is provided with the above-described configuration, a low yellow index value, low excitation purity and high heat shielding properties can be achieved in spite of the thickness varying with places. Furthermore, between a place being thick in thickness of the interlayer film and a place being thin in thickness thereof, the difference in the YI value and the difference in the excitation purity can be made small. Although the YI value is sometimes increased when the ultraviolet ray screening agent is used and tungsten oxide particles are not used, by using the ultraviolet ray screening agent and the tungsten oxide particles together, an increase in the YT value can be effectively suppressed. Particularly, even in a thick part of the interlayer film, an increase in the YI value can be effectively suppressed.

Furthermore, in the present invention, since the thickness of one end of an interlayer film is thinner than the thickness of the other end thereof, for example, when laminated glass prepared with the interlayer film is used for a head-up display (HUD), even when measured information such as the speed which is traveling data of an automobile and the like is displayed thereon, it is possible to suppress the measured information from being doubly observed.

When the interlayer film according to the present invention has a one-layer structure, the interlayer film is provided with only a first layer, and the first layer contains a thermoplastic resin, tungsten oxide particles and a benzotriazole-based ultraviolet ray screening agent as the ultraviolet ray screening agent.

When the interlayer film according to the present invention has a two or more-layer structure, at least one layer among all layers included in the interlayer film contains a thermoplastic resin, tungsten oxide particles and a benzotriazole-based ultraviolet ray screening agent. For example, when the interlayer film is provided with a first layer and a second layer, at least one layer of the first layer and the second layer contains a thermoplastic resin, contains tungsten oxide particles and contains a benzotriazole-based ultraviolet ray screening agent.

The distance between one end and the other end of the interlayer film is defined as X. In the interlayer film, the excitation purity at a point positioned at a distance of 0.1X from the other end toward the inside is preferably 2.6 or less and more preferably 2.1 or less.

The absolute value of the difference between the excitation purity at a point positioned at a distance of 0.1X from the other end toward the inside and the excitation purity at a point positioned at a distance of 0.1X from the one end toward the inside is preferably 1 or less and more preferably 0.6 or less.

The difference between the maximum thickness and the minimum thickness of the interlayer film is preferably 0.1 mm or more, more preferably 0.3 mm or more, further preferably 0.5 mm or more, preferably 3.0 mm or less, more preferably 2.0 mm or less and further preferably 1.5 mm or less. When the difference between the maximum thickness and the minimum thickness of the interlayer film is the above lower limit or more and the above upper limit or less, a low yellow index value, low excitation purity and high heat shielding properties can be further improved with good balance.

The difference between the maximum thickness and the minimum thickness of the first layer is preferably 0.1 mm or more, more preferably 0.3 mm or more, further preferably 0.5 mm or more, preferably 3.0 mm or less, more preferably 2.0 mm or less and further preferably 1.5 mm or less. When the difference between the maximum thickness and the minimum thickness of the first layer is the above lower limit or more and the above upper limit or less, a low yellow index value, low excitation purity and high heat shielding properties can be further improved with good balance.

The difference between the maximum thickness and the minimum thickness of the second layer is preferably 0.1 mm or more, more preferably 0.3 mm or more, further preferably 0.5 mm or more, preferably 3.0 mm or less, more preferably 2.0 mm or less and further preferably 1.5 mm or less. When the difference between the maximum thickness and the minimum thickness of the second layer is the above lower limit or more and the above upper limit or less, a low yellow index value, low excitation purity and high heat shielding properties can be further improved with good balance.

The distance between the one end and the other end of the interlayer film is defined as X. The thickness of the interlayer film at a point positioned at a distance of 0.1X from the other end toward the inside is preferably 1.2 times or more, more preferably 1.35 times or more, further preferably 1.5 times or more, preferably 3.2 times or less, more preferably 2.9 times or less and further preferably 2.3 times or less, of the thickness of the interlayer film at a point positioned at a distance of 0.1X from the one end toward the inside. When the relationship between the thicknesses like this is satisfied, a low yellow index value, low excitation purity and high heat shielding properties can be further improved with good balance.

The thickness of the first layer at a point positioned at a distance of 0.1X from the other end toward the inside is preferably 1.2 times or more, more preferably 1.35 times or more, further preferably 1.5 times or more, preferably 3.2 times or less, more preferably 2.9 times or less and further preferably 2.3 times or less, of the thickness of the first layer at a point positioned at a distance of 0.1X from the one end toward the inside. When the relationship between the thicknesses like this is satisfied, a low yellow index value, low excitation purity and high heat shielding properties can be further improved with good balance.

The thickness of the second layer at a point positioned at a distance of 0.1X from the other end toward the inside is preferably 1.2 times or more, more preferably 1.35 times or more, further preferably 1.5 times or more, preferably 3.2 times or less, more preferably 2.9 times or less and further preferably 2.3 times or less, of the thickness of the second layer at a point positioned at a distance of 0.1X from the one end toward the inside. When the relationship between the thicknesses like this is satisfied, a low yellow index value, low excitation purity and high heat shielding properties can be further improved with good balance.

Hereinafter, specific embodiments of the present invention will be described with reference to the drawings.

FIGS. 1(a) and 1(b) show an interlayer film for laminated glass in accordance with a first embodiment of the present invention schematically represented as a sectional view and a plan view. FIG. 1(a) is a sectional front view taken along the line I-I in FIG. 1(b).

In FIG. 1(a), a section in the thickness direction of an interlayer film 11 is shown. In this connection, in FIG. 1(a) and figures described below, for convenience of illustration, the thicknesses of an interlayer film and respective layers constituting the interlayer film and the wedge angle θ are shown so as to be different from actual thicknesses thereof and an actual wedge angle.

The interlayer film 11 is provided with a first layer 1 (intermediate layer), a second layer (surface layer) and a third layer (surface layer). The second layer 2 is arranged on a first surface side of the first layer 1 to be layered thereon. The third layer 3 is arranged on a second surface side opposite to the first surface of the first layer 1 to be layered thereon. The first layer 1 is arranged between the second layer 2 and the third layer 3 to be sandwiched therebetween. The interlayer film 11 is used for obtaining laminated glass. The interlayer film 11 is an interlayer film for laminated glass. The interlayer film 11 is a multilayer interlayer film.

The interlayer film 11 has one end 11a and the other end 11b at the opposite side of the one end 11a. The one end 11a and the other end 11b are end parts of both sides facing each other. The sectional shape in the thickness direction of each of the second layer 2 and the third layer 3 is a wedge-like shape. The sectional shape in the thickness direction of the first layer 1 is a rectangular shape. The thickness of the one end 11a side of each of the second layer 2 and the third layer 3 is thinner than that of the other end 11b side thereof. Accordingly, the thickness of the one end 11a of the interlayer film 11 is thinner than the thickness of the other end 11b thereof. Accordingly, the interlayer film 11 has a region being thin in thickness and a region being thick in thickness.

The difference between the maximum thickness and the minimum thickness in the first layer 1 is smaller than the difference between the maximum thickness and the minimum thickness in the second layer 2. The difference between the maximum thickness and the minimum thickness in the first layer 1 is smaller than the difference between the maximum thickness and the minimum thickness in the third layer 3.

With regard to the embodiment shown in FIG. 1, at least one layer of the first layer 1, the second layer 2 and the third layer 3 contains a thermoplastic resin, contains tungsten oxide particles and contains a benzotriazole-based ultraviolet ray screening agent.

FIGS. 2(a) and 2(b) show an interlayer film for laminated glass in accordance with a second embodiment of the present invention schematically represented as a sectional view and a plan view. FIG. 2(a) is a sectional front view taken along the line I-I in FIG. 2(b). In FIG. 2(a), a section in the thickness direction of an interlayer film 11A is shown.

The interlayer film 11A shown in FIG. 2 is provided with a first layer 1A. The interlayer film 11A has a one-layer structure composed only of the first layer 1A and is a single-layered interlayer film. The interlayer film 11A corresponds to the first layer 1A. The interlayer film 11A is used for obtaining laminated glass. The interlayer film 11A is an interlayer film for laminated glass.

The sectional shape in the thickness direction of each of the interlayer film 11A and the first layer 1A is a wedge-like shape. The interlayer film 11A has one end 11a and the other end 11b at the opposite side of the one end 11a. The one end 11a and the other end 11b are end parts of both sides facing each other. The thickness of the one end 11a of the interlayer film 11A is thinner than the thickness of the other end 11b thereof. Accordingly, each of the interlayer film 11A and the first layer 1A has a region being thin in thickness and a region being thick in thickness.

The interlayer film 11 shown in FIG. 1 has a structure in which the rectangular-shaped first layer 1 is sandwiched between the wedge-shaped second layer 2 and the wedge-shaped third layer 3. In FIGS. 3 to 7, first to fifth modified examples in which shapes of respective layers in the interlayer film are changed are shown.

An interlayer film 11B in accordance with the first modified example shown in FIG. 3 is provided with a first layer 1B having a sectional shape in the thickness direction of a wedge-like shape, a second layer 2B having a sectional shape in the thickness direction of a wedge-like shape and a third layer 3B having a sectional shape in the thickness direction of a wedge-like shape. The first layer 1B is arranged between the second layer 2B and the third layer 3B to be sandwiched therebetween.

The thickness of the one end 11a side of each of the first layer 1B, the second layer 2B and the third layer 3B is thinner than that of the other end 11b side thereof. Accordingly, the interlayer film 11B has a region being thin in thickness and a region being thick in thickness.

An interlayer film 11C in accordance with the second modified example shown in FIG. 4 is provided with a first layer 1C having a sectional shape in the thickness direction of a rectangular shape, a second layer 2C having a sectional shape in the thickness direction of a wedge-like shape and a third layer 3C having a sectional shape in the thickness direction of a rectangular shape. The first layer 1C is arranged between the second layer 2C and the third layer 3C to be sandwiched therebetween. The thickness of the one end 11a side of the second layer 2C is thinner than that of the other end 11b side thereof. Accordingly, the interlayer film 11C has a region being thin in thickness and a region being thick in thickness. The interlayer film may be a single-layered interlayer film with a shape of the interlayer film 11C.

An interlayer film 11D in accordance with the third modified example shown in FIG. 5 is provided with a first layer 1D having a sectional shape in the thickness direction of a rectangular shape, a second layer 2D having a sectional shape in the thickness direction of a wedge-like shape and a third layer 3D having a sectional shape in the thickness direction of a rectangular shape. The second layer 2D is arranged between the first layer 1D and the third layer 3D to be sandwiched therebetween. The thickness of the one end 11a side of the second layer 2D is thinner than that of the other end 11b side thereof. Accordingly, the interlayer film 11D has a region being thin in thickness and a region being thick in thickness.

An interlayer film 11E in accordance with the fourth modified example shown in FIG. 6 is provided with a first layer 1E having a sectional shape in the thickness direction of a rectangular shape and a second layer 2E having a sectional shape in the thickness direction of a wedge-like shape. The second layer 2E is arranged on a first surface side of the first layer 1E to be layered thereon. The thickness of the one end 11a side of the second layer 2E is thinner than that of the other end 11b side thereof. Accordingly, the interlayer film 11E has a region being thin in thickness and a region being thick in thickness.

An interlayer film 11F in accordance with the fifth modified example shown in FIG. 7 is provided with a first layer 1F having a sectional shape in the thickness direction of a rectangular shape and a second layer 2F having a portion 2Fa in which the sectional shape in the thickness direction is a rectangular shape and a portion 2Fb in which the sectional shape in the thickness direction is a wedge-like shape. The second layer 2F is arranged on a first surface side of the first layer 1F to be layered thereon. The thickness of the one end 11a side of the second layer 2F is thinner than that of the other end 11b side thereof. Accordingly, the interlayer film 11F has a region being thin in thickness and a region being thick in thickness. The interlayer film may be a single-layered interlayer film with a shape of the interlayer film 11F.

It is preferred that the interlayer film have a portion in which the sectional shape in the thickness direction is a wedge-like shape. It is preferred that the interlayer film have a portion in which the thickness is gradually thickened from one end toward the other end. It is preferred that the sectional shape in the thickness direction of the interlayer film be a wedge-like shape. Examples of the sectional shape in the thickness direction of the interlayer film include a trapezoidal shape, a triangular shape, a pentagonal shape, and the like.

In order to suppress double images, the wedge angle $\theta$ of the interlayer film can be appropriately set according to fitting angles of laminated glass. From the viewpoint of further suppressing double images, the wedge angle $\theta$ of the interlayer film is preferably 0.01 mrad (0.0006 degree) or more, more preferably 0.2 mrad (0.0115 degree) or more, preferably 2 mrad (0.1146 degree) or less and more preferably 0.7 mrad (0.0401 degree) or less.

The interlayer film may have a colored band area in a partial region. The interlayer film may have a colored region in a partial region. When a multi-layered interlayer film has a colored band area or a colored region, it is preferred that a surface layer have a colored band area or a colored region. However, an intermediate layer may have a colored band area or a colored region. For example, at the time of extrusion-molding an interlayer film or at the time of extrusion-molding the respective layers of the interlayer film, the colored band area or the colored region can be formed by blending a coloring agent into a prescribed region.

The thickness of the interlayer film is not particularly limited. The thickness of the interlayer film refers to the total thickness of the respective layers constituting the interlayer film. Thus, in the case of a multi-layered interlayer film 11, the thickness of the interlayer film refers to the total thickness of the first layer 1, the second layer 2 and the third layer 3.

The maximum thickness of the interlayer film is preferably 0.1 mm or more, more preferably 0.25 mm or more, further preferably 0.5 mm or more, especially preferably 0.8 mm or more, preferably 3 mm or less, more preferably 2 mm or less and further preferably 1.5 mm or less.

When the distance between one end and the other end is defined as X, it is preferred that the interlayer film have a minimum thickness in a region within a distance of 0X to 0.2X from the one end toward the inside and have a maximum thickness in a region within a distance of 0X to 0.2X from the other end toward the inside, and it is more preferred that the interlayer film have a minimum thickness in a region within a distance of 0X to 0.1X from the one end toward the inside and have a maximum thickness in a region within a distance of 0X to 0.1X from the other end toward the inside. It is preferred that one end of the interlayer film have a minimum thickness and the other end of the interlayer film have a maximum thickness. In the interlayer films 11, 11A, 11B, 11C, 11D, 11E and 11F, the one end 11a has a minimum thickness and the other end 11b has a maximum thickness.

From the viewpoint of the practical aspect and the viewpoint of sufficiently heightening the adhesive force and the penetration resistance, the maximum thickness of a surface layer is preferably 0.001 mm or more, more preferably 0.2 mm or more, further preferably 0.3 mm or more, preferably 1 mm or less and more preferably 0.8 mm or less.

From the viewpoint of the practical aspect and the viewpoint of sufficiently enhancing the penetration resistance, with regard to the thickness of a layer (intermediate layer) arranged between two surface layers, the maximum thickness thereof is preferably 0.001 mm or more, more preferably 0.1 mm or more, further preferably 0.2 mm or more, preferably 0.8 mm or less, more preferably 0.6 mm or less and further preferably 0.3 mm or less. The wedge angle θ is an interior angle at the intersection point of a straight line connecting a maximum thickness part and a minimum thickness part on the first surface of the interlayer film and a straight line connecting a maximum thickness part to a minimum thickness part on the second surface of the interlayer film.

Hereinafter, the details of materials constituting the respective layers of a multi-layered interlayer film and the single-layered interlayer film will be described.

(Thermoplastic Resin)

A thermoplastic resin included in the interlayer film according to the present invention (contained in the respective layers) is not particularly limited. As the thermoplastic resin, a conventionally known thermoplastic resin can be used. One kind of the thermoplastic resin may be used alone, and two or more kinds thereof may be combinedly used.

Examples of the thermoplastic resin include a polyvinyl acetal resin, an ethylene-vinyl acetate copolymer resin, an ethylene-acrylic acid copolymer resin, a polyurethane resin, a polyvinyl alcohol resin, and the like. Thermoplastic resins other than these may be used.

It is preferred that the thermoplastic resin be a polyvinyl acetal resin. By using a polyvinyl acetal resin and a plasticizer together, the adhesive force of the interlayer film for laminated glass according to the present invention to a laminated glass member or another interlayer film is further heightened.

For example, the polyvinyl acetal resin can be produced by acetalizing polyvinyl alcohol (PVA) with an aldehyde. It is preferred that the polyvinyl acetal resin be an acetalized product of polyvinyl alcohol. For example, the polyvinyl alcohol can be produced by saponifying polyvinyl acetate. The saponification degree of the polyvinyl alcohol generally lies within the range of 70 to 99.5% by mole.

The average polymerization degree of the polyvinyl alcohol is preferably 200 or more, more preferably 500 or more, even more preferably 1500 or more, further preferably 1600 or more, especially preferably 2600 or more, most preferably 2700 or more, preferably 5000 or less, more preferably 4000 or less and further preferably 3500 or less. When the average polymerization degree is the above lower limit or more, the penetration resistance of laminated glass is further enhanced. When the average polymerization degree is the above upper limit or less, formation of an interlayer film is facilitated.

The average polymerization degree of the polyvinyl alcohol is determined by a method in accordance with JIS K6726 "Testing methods for polyvinyl alcohol".

The number of carbon atoms of the acetal group contained in the polyvinyl acetal resin is not particularly limited. The aldehyde used at the time of producing the polyvinyl acetal resin is not particularly limited. It is preferred that the number of carbon atoms of the acetal group in the polyvinyl acetal resin be 3 or 4. When the number of carbon atoms of the acetal group in the polyvinyl acetal resin is 3 or more, the glass transition temperature of the interlayer film is sufficiently lowered.

The aldehyde is not particularly limited. In general, as the aldehyde, an aldehyde with 1 to 10 carbon atoms is suitably used. Examples of the aldehyde with 1 to 10 carbon atoms used include propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, benzaldehyde, and the like. Of these, propionaldehyde, n-butyraldehyde, isobutyaldehyde, n-hexylaldehyde or n-valeraldehyde is preferred, propionaldehyde, n-butyraldehyde or isobutyraldehyde is more preferred, and n-butyraldehyde is further preferred. One kind of the aldehyde may be used alone, and two or more kinds thereof may be combinedly used.

The content of the hydroxyl group (the amount of hydroxyl groups) of the polyvinyl acetal resin is preferably 15% by mole or more, more preferably 18% by mole or more, preferably 40% by mole or less, more preferably 35% by mole or less. When the content of the hydroxyl group is the above lower limit or more, the adhesive force of the interlayer film is further heightened. Moreover, when the content of the hydroxyl group is the above upper limit or less, the flexibility of the interlayer film is enhanced and the handling of the interlayer film is facilitated.

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be measured in accordance with JIS K6728 "Testing methods for polyvinyl butyral".

The acetylation degree (the amount of acetyl groups) of the polyvinyl acetal resin is preferably 0.1% by mole or more, more preferably 0.3% by mole or more, further preferably 0.5% by mole or more, preferably 30% by mole or less, more preferably 25% by mode or less and further preferably 20% by mole or less. When the acetylation degree is the above lower limit or more, the compatibility between the polyvinyl acetal resin and a plasticizer is heightened. When the acetylation degree is the above upper limit or less, with regard to the interlayer film and laminated glass, the moisture resistance thereof is enhanced.

The acetylation degree is a mole fraction, represented in percentage, obtained by dividing the amount of ethylene groups to which the acetyl group is bonded by the total amount of ethylene groups in the main chain. For example, the amount of ethylene groups to which the acetyl group is bonded can be measured in accordance with JIS K6728 "Testing methods for polyvinyl butyral".

The acetalization degree of the polyvinyl acetal resin (the butyralization degree in the case of a polyvinyl butyral resin) is preferably 60% by mole or more, more preferably 63% by mole or more, preferably 35% by mode or less, more preferably 75% by mole or less and further preferably 70% by mole or less. When the acetalization degree is the above lower limit or more, the compatibility between the polyvinyl acetal resin and a plasticizer is heightened. When the acetalization degree is the above upper limit or less, the reaction time required for producing the polyvinyl acetal resin is shortened.

The acetalization degree is a mole fraction, represented in percentage, obtained by dividing a value obtained by subtracting the amount of ethylene groups to which the hydroxyl group is bonded and the amount of ethylene groups to which the acetyl group is bonded from the total amount of ethylene groups in the main chain by the total amount of ethylene groups in the main chain.

In this connection, it is preferred that the content of the hydroxyl group (the amount of hydroxyl groups), the acetalization degree (the butyralization degree) and the acetylation degree be calculated from the results measured by a method in accordance with JIS K6728 "Testing methods for polyvinyl butyral". When the polyvinyl acetal resin is a polyvinyl butyral resin, it is preferred that the content of the hydroxyl group (the amount of hydroxyl groups), the acetalization degree (the butyralization degree) and the acetylation degree be calculated from the results measured by a method in accordance with JIS K6728 "Testing methods for polyvinyl butyral".

(Plasticizer)

From the viewpoint of further heightening the adhesive force of an interlayer film, it is preferred that the interlayer film according to the present invention include (the respective layers contain) a plasticizer. When the thermoplastic resin included in an interlayer film is a polyvinyl acetal resin, it is especially preferred that the interlayer film include (the respective layers contain) a plasticizer. It is preferred that a layer containing a polyvinyl acetal resin contain a plasticizer.

The plasticizer is not particularly limited. As the plasticizer, a conventionally known plasticizer can be used. One kind of the plasticizer may be used alone, and two or more kinds thereof may be combinedly used.

Examples of the plasticizer include organic ester plasticizers such as a monobasic organic acid ester and a polybasic organic acid ester, organic phosphate plasticizers such as an organic phosphate plasticizer and an organic phosphite plasticizer, and the like. Of these, organic ester plasticizers are preferred. It is preferred that the plasticizer be a liquid plasticizer.

The monobasic organic acid ester is not particularly limited, and examples thereof include a glycol ester obtained by the reaction of a glycol with a monobasic organic acid, an ester of triethylene glycol or tripropylene glycol with a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, heptanoic acid, n-octylic acid, 2-ethylhexanoic acid, n-nonylic acid, decanoic acid, and the like.

The polybasic organic acid ester is not particularly limited and examples thereof include an ester compound of a polybasic organic acid and an alcohol having a linear or branched structure of 4 to 8 carbon atoms. Examples of the polybasic organic acid include adipic acid, sebacic acid, azelaic acid, and the like.

Examples of the organic ester plasticizer include, but not limited to, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyds, a mixture of a phosphoric acid ester and an adipic acid ester, and the like. Organic ester plasticizers other than these may be used.

Examples of the organic phosphate plasticizer include, but not limited to, tributoxyethyl phosphate, isodecyl phenyl phosphate, triisopropyl phosphate, and the like.

It is preferred that the plasticizer be a diester plasticizer represented by the following formula (1).

[Chemical 1]

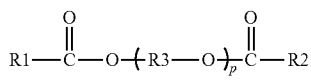

(1)

In the foregoing formula (1), R1 and R2 each represent an organic group with 5 to 10 carbon atoms, R3 represents an ethylene group, an isopropylene group or an n-propylene group, and p represents an integer of 3 to 10. It is preferred that R1 and R2 in the foregoing formula (1) each be an organic group with 6 to 10 carbon atoms.

It is preferred that the plasticizer include triethylene glycol di-2-ethylhexanoate (3GO) or triethylene glycol di-2-ethylbutyrate (3GH), and it is more preferred that the plasticizer include triethylene glycol di-2-ethylhexanoate.

The content of the plasticizer is not particularly limited. In the respective layers, the content of the plasticizer is preferably 25 parts by weight or more, more preferably 30 parts by weight or more, preferably 60 parts by weight or less and more preferably 50 parts by weight or less, relative to 100 parts by weight of the thermoplastic resin. When the content of the plasticizer is the above lower limit or more, the penetration resistance of laminated glass is further enhanced. When the content of the plasticizer is the above upper limit or less, the transparency of the interlayer film is further enhanced.

(Heat Shielding Compound)

The interlayer film includes a heat shielding compound. It is preferred that the first layer contain a heat shielding compound. It is preferred that the second layer contain a heat shielding compound. It is preferred that the third layer contain a heat shielding compound. One kind of the heat shielding compound may be used alone, and two or more kinds thereof may be combinedly used.

Ingredient X:

It is preferred that the interlayer film include at least one kind of Ingredient X among a phthalocyanine compound, a naphthalocyanine compound and an anthracyanine compound. It is preferred that the first layer contain the Ingredient X. It is preferred that the second layer contain the Ingredient X. It is preferred that the third layer contain the Ingredient X. The Ingredient X is a heat shielding compound. One kind of the Ingredient X may be used alone, and two or more kinds thereof may be combinedly used.

The Ingredient X is not particularly limited. As the Ingredient X, conventionally known phthalocyanine compound, naphthalocyanine compound and anthracyanine compound can be used.

Examples of the Ingredient X include phthalocyanine, a derivative of phthalocyanine, naphthalocyanine, a derivative of naphthalocyanine, anthracyanine, a derivative of anthracyanine, and the like. It is preferred that each of the phthalocyanine compound and the derivative of phthalocyanine have a phthalocyanine skeleton. It is preferred that each of the naphthalocyanine compound and the derivative of naphthalocyanine have a naphthalocyanine skeleton. It is preferred that each of the anthracyanine compound and the derivative of anthracyanine have an anthracyanine skeleton.

With regard to the interlayer film and laminated glass, from the viewpoint of further enhancing the heat shielding properties thereof, it is preferred that the Ingredient X be at least one kind selected from the group consisting of phthalocyanine, a derivative of phthalocyanine, naphthalocyanine and a derivative of naphthalocyanine, and it is more preferred that the Ingredient X be at least one kind among phthalocyanine and a derivative of phthalocyanine.

From the viewpoints of effectively enhancing the heat shielding properties and maintaining the visible light transmittance at a higher level over a long period of time, it is preferred that the Ingredient X contain vanadium atoms or copper atoms. It is preferred that the Ingredient X contain vanadium atoms and it is also preferred, that the Ingredient X contain copper atoms. It is more preferred that the Ingredient X be at least one kind among phthalocyanine containing vanadium atoms or copper atoms and a derivative of phthalocyanine containing vanadium atoms or copper atoms. With regard to the interlayer film and laminated glass, from the viewpoint of still further enhancing the heat shielding properties thereof, it is preferred that the Ingredient X have a structural unit in which an oxygen atom is bonded to a vanadium atom.

In 100% by weight of a layer containing the Ingredient X (a first layer, a second layer or a third layer), the content of the Ingredient X is preferably 0.001% by weight or more, more preferably 0.005% by weight or more, further preferably 0.01% by weight or more, especially preferably 0.02% by weight or more, preferably 0.2% by weight or less, more preferably 0.1% by weight or less, further preferably 0.05% by weight or less and especially preferably 0.04% by weight or less. When the content of the Ingredient X is the above lower limit or more and the above upper limit or less, the heat shielding properties are sufficiently enhanced and the visible light transmittance is sufficiently heightened. For example, it is possible to make the visible light transmittance 70% or more.

Heat Shielding Particles

It is preferred that the interlayer film include heat shielding particles. It is preferred that the first layer contain the heat shielding particles. It is preferred that the second layer contain the heat shielding particles. It is preferred that the third layer contain the heat shielding particles. The heat shielding particle is of a heat shielding compound. By the use of heat shielding particles, infrared rays (heat rays) can be effectively cut off. One kind of the heat shielding particles may be used alone, and two or more kinds thereof may be combinedly used.

From the viewpoint of further heightening the heat shielding properties of laminated glass, it is more preferred that the heat shielding particles be metal oxide particles. It is preferred that the heat shielding particle be a particle (a metal oxide particle) formed from an oxide of a metal.

The energy amount of an infrared ray with a wavelength of 780 nm or longer which is longer than that of visible light is small as compared with an ultraviolet ray. However, the thermal action of infrared rays is large, and when infrared rays are absorbed into a substance, heat is released from the substance. As such, infrared rays are generally called heat rays. By the use of the heat shielding particles, infrared rays (heat rays) can be effectively cut off. In this connection, the heat shielding particle means a particle capable of absorbing infrared rays.

Specific examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles, thallium-doped tungsten oxide particles, rubidium-doped tungsten oxide particles, tin-doped indium oxide particles (ITO particles), tin-doped zinc oxide particles and silicon-doped zinc oxide particles, lanthanum hexaboride ($LaB_6$) particles, and the like. Heat shielding particles other than these may be used. Of these, since the heat ray shielding function is high, preferred are metal oxide particles, more preferred are ATO particles, GZO particles, IZO particles, ITO particles or tungsten oxide particles, and especially preferred are ITO particles or tungsten oxide particles. In particular, since the heat ray shielding function is high and the particles are readily available, preferred are tin-doped indium oxide particles (ITO particles), and also preferred are tungsten oxide particles.

The tungsten oxide particles are generally represented by the following formula (X1) or the following formula (X2). In the interlayer film, the tungsten oxide particles represented by the following formula (X1) or the following formula (X2) are suitably used.

$$W_yO_z \quad \text{Formula (X1)}$$

In the foregoing formula (X1), W represents tungsten, O represents oxygen, and y and z satisfy the relation of $2.0 < z/y < 3.0$.

$$M_xW_yO_z \quad \text{Formula (X2)}$$

In the foregoing formula (X2), M represents at least one kind of element selected from the group consisting of H, He, an alkali metal, an alkaline earth metal, a rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta and Re, W represents tungsten, O represents oxygen, and x, y and z satisfy the relations of $0.001 \leq xy/y < 1$ and $2.0 < zy/y \leq 3.0$.

From the viewpoints of further enhancing the optical characteristics of laminated glass and further enhancing the durability of laminated glass, it is preferred that the tungsten oxide particles be tungsten oxide particles represented by the following formula (X3).

$$M_xWO_x \quad \text{Formula (X3)}$$

In the foregoing formula (X3), M represents at least one kind of element selected from the group consisting of Cs, Rb, K, Tl, In, Ba, Li, Ca, Sr, Fe, Sn, Al and Cu, W represents tungsten, O represents oxygen, x satisfies the relation of $0.1 \leq X \leq 0.5$, and z satisfies the relation of $2.2 \leq z \leq 3.0$.

With regard to the interlayer film and laminated glass, from the viewpoint of further enhancing the heat shielding properties thereof, it is preferred that the tungsten oxide particles be metal-doped tungsten oxide particles. Examples of the "tungsten oxide particles" include metal-doped tungsten oxide particles. Specifically, examples of the metal-doped tungsten oxide particles include sodium-doped tungsten oxide particles, cesium-doped tungsten oxide particles, thallium-doped tungsten oxide particles, rubidium-doped tungsten oxide particles, and the like.

With regard to the interlayer film and laminated glass, from the viewpoint of further enhancing the heat shielding properties thereof, cesium-doped tungsten oxide particles are especially preferred. With regard to the interlayer film and laminated glass, from the viewpoint of still further enhancing the heat shielding properties thereof, it is preferred that the cesium-doped tungsten oxide particles be tungsten oxide particles represented by the formula: $Cs_{0.33}WO_3$.

The average particle diameter of the heat shielding particles is preferably 0.01 µm or more, more preferably 0.02 µm or more, preferably 0.1 µm or less and more preferably 0.05 µm or less. When the average particle diameter is the above lower limit or more, the heat ray shielding properties are sufficiently heightened. When the average particle diameter is the above upper limit or less, the dispersibility of heat shielding particles is enhanced.

The "average particle diameter" refers to the volume average particle diameter. The average particle diameter can be measured using a particle size distribution measuring apparatus ("UPA-EX150" available from NIKKISO CO., LTD.), or the like.

In 100% by weight of a layer containing the heat shielding particles (a first layer, a second layer or a third layer), each content of the heat shielding particles (especially, the content of tungsten oxide particles) is preferably 0.01% by weight or more, more preferably 0.1% by weight or more, further preferably 1% by weight or more, especially preferably 1.5% by weight or more, preferably 6% by weight or less, more preferably 5.5% by weight or less, further preferably 4% by weight or less, especially preferably 3.5% by weight or less and most preferably 3.0% by weight or less. When the content of the heat shielding particles is the above lower limit or more and the above upper limit or less, the heat shielding properties are sufficiently enhanced and the visible light transmittance is sufficiently heightened.

It is preferred that a layer containing the heat shielding particles (a first layer, a second layer or a third layer) contain the heat shielding particles (especially, tungsten oxide particles) in a proportion of 0.1 g/m$^2$ or more and 12 g/m$^2$ or less. When the proportion of the heat shielding particles falls within the above-mentioned range, the heat shielding properties are sufficiently enhanced and the visible light transmittance is sufficiently heightened. The proportion of the heat shielding particles is preferably 0.5 g/m$^2$ or more, more preferably 0.8 g/m$^2$ or more, further preferably 1.5 g/m$^2$ or more, especially preferably 3 g/m$^2$ or more, preferably 11 g/m$^2$ or less, more preferably 10 g/m$^2$ or less, further preferably 9 g/m$^2$ or less and especially preferably 7 g/m$^2$ or less. When the proportion is the above lower limit or more, the heat shielding properties are further enhanced. When the proportion is the above upper limit or less, the visible light transmittance is further heightened.

(Metal Salt)

It is preferred that the interlayer film include at least one kind of metal salt (hereinafter, sometimes described as Metal salt M) among an alkali metal salt and an alkaline earth metal salt. It is preferred that the first layer contain the Metal salt M. It is preferred that the second layer contain the Metal salt M. It is preferred that the third layer contain the Metal salt M. By the use of the Metal salt M, controlling the adhesivity between the interlayer film and a glass sheet or the adhesivity between respective layers in the interlayer film is facilitated. One kind of the Metal salt M may be used alone, and two or more kinds thereof may be combinedly used.

It is preferred that the Metal salt M contain at least one kind of metal selected from the group consisting of Li, Na, K, Rb, Cs, Mg, Ca, Sr and Ba. It is preferred that the metal salt included in the interlayer film contain at least one kind of metal among K and Mg.

Moreover, it is more preferred that the Metal salt M be an alkali metal salt of an organic acid with 2 to 16 carbon atoms or an alkaline earth metal salt of an organic acid with 2 to 16 carbon atoms, and it is further preferred, that the Metal salt M be a magnesium carboxylate with 2 to 16 carbon atoms or a potassium carboxylate with 2 to 16 carbon atoms.

Although the magnesium carboxylate with 2 to 16 carbon atoms and the potassium carboxylate with 2 to 16 carbon atoms are not particularly limited, examples thereof include magnesium acetate, potassium acetate, magnesium propionate, potassium propionate, magnesium 2-ethylbutyrate, potassium 2-ethylbutanoate, magnesium 2-ethylhexanoate, potassium 2-ethylhexanoate, and the like.

The total of the contents of Mg and K in a layer containing the Metal salt M (a first layer, a second layer or a third layer) is preferably 5 ppm or more, more preferably 10 ppm or more, further preferably 20 ppm or more, preferably 300 ppm or less, more preferably 250 ppm or less and further preferably 200 ppm or less. When the total of the contents of Mg and K is the above lower limit or more and the above upper limit or less, the adhesivity between the interlayer film and a glass sheet or the adhesivity between respective layers in the interlayer film can be further well controlled.

(Ultraviolet Ray Screening Agent)

The interlayer film includes an ultraviolet ray screening agent. The interlayer film includes at least a benzotriazole-based ultraviolet ray screening agent. A benzotriazole-based ultraviolet ray screening agent and another ultraviolet ray screening agent may be combinedly used. It is preferred that the first layer contain an ultraviolet ray screening agent. It is preferred that the second layer contain an ultraviolet ray screening agent. It is preferred that the third layer contain an ultraviolet ray screening agent. By the use of an ultraviolet ray screening agent, even when the interlayer film and the laminated glass are used for a long period of time, the visible light transmittance becomes further difficult to be lowered. One kind of the ultraviolet ray screening agent may be used alone, and two or more kinds thereof may be combinedly used.

Examples of the ultraviolet ray screening agent include an ultraviolet ray absorber. It is preferred that the ultraviolet ray screening agent be an ultraviolet ray absorber.

Examples of the ultraviolet ray screening agent include a metal-based ultraviolet ray screening agent (an ultraviolet ray screening agent containing a metal), a metal oxide-based ultraviolet ray screening agent (an ultraviolet ray screening agent containing a metal oxide), a benzotriazole-based ultraviolet ray screening agent (an ultraviolet ray screening agent having a benzotriazole structure), a benzophenone-based ultraviolet ray screening agent (an ultraviolet ray screening agent having a benzophenone structure), a triazine-based ultraviolet ray screening agent (an ultraviolet ray screening agent having a triazine structure), a malonic acid ester-based ultraviolet ray screening agent (an ultraviolet ray screening agent having a roalonic acid ester structure), an oxanilide-based ultraviolet ray screening agent (an ultraviolet ray screening agent having an oxanilide structure), a benzoate-based ultraviolet ray screening agent (an ultraviolet ray screening agent having a benzoate structure), and the like.

Examples of the metal-based ultraviolet ray screening agent include platinum particles, particles in which the surface of platinum particles is coated with silica, palladium particles, particles in which the surface of palladium particles is coated with silica, and the like. It is preferred that the ultraviolet ray screening agent not be heat screening particles.

The ultraviolet ray screening agent is preferably a benzotriazole-based ultraviolet ray screening agent, a benzophenone-based ultraviolet ray screening agent, a triazine-based ultraviolet ray screening agent or a benzoate-based ultraviolet ray screening agent, more preferably a benzotriazole-based ultraviolet ray screening agent or a benzophenone-based ultraviolet ray screening agent, and further preferably a benzotriazole-based ultraviolet ray screening agent.

Examples of the metal oxide-based ultraviolet ray screening agent include zinc oxide, titanium oxide, cerium oxide, and the like. Furthermore, with regard to the metal oxide-based ultraviolet ray screening agent, the surface thereof may be coated with any material. Examples of the coating material for the surface of the metal oxide-based ultraviolet ray screening agent include an insulating metal oxide, a hydrolyzable organosilicon compound, a silicone compound, and the like.

Examples of the insulating metal oxide include silica, alumina, zirconia and the like. For example, the insulating metal oxide has a band-gap energy of 5.0 eV or more.

Examples of the benzotriazole-based ultraviolet ray screening agent include benzotriazole-based ultraviolet ray screening agents such as 2-(2'-hydroxy-5'-methylphenyl)benzotriazole ("Tinuvin P" available from BASF Japan Ltd.)., 2-(2'-hydroxy-3',5'-di-t-butylphenyl)benzotriazole ("Tinuvin 320" available from BASF Japan Ltd.), 3-(2'-hydroxy-3'-t-butyl-5-methylphenyl)-5-chlorobenzotriazole ("Tinuvin 326" available from BASF Japan Ltd.) and 2-(2'-hydroxy-3',5'-di-amylphenyl)benzotriazole ("Tinuvin 328" available from BASF Japan Ltd.). Furthermore, examples of the benzotriazole-based ultraviolet ray screening agent include 3-(5-chloro-2H-benzotriazol-2-yl)-5-(1,1-dimethylethyl)-4-hydroxyphenylpropionic acid methyl ester (CAS. No. 83044-91-1), 4-(benzotriazol-2-yl)benzene-1,3-diode (CAS. No. 22607-31-4), 2-(2H-benzotriazol-2-yl)-5-butoxy-phenol (CAS. No. 197251-58-4), "Tinuvin 327" available from BASF Japan Ltd. (CAS. No. 3864-99-1) 2-(2H-benzotriazol-2-yl)-5-(octyloxy)-phenol (CAS. No. 3147-77-1), 2-(2H-benzotriazol-2-yl)-4-(1,1)-dimethylethyl)-6-(1-methylpropyl)phenol (CAS. No. 36437-37-3), 2,2'-methylenebis[6-(benzotriazol-2-yl)-4-tert-octylphenol] (CAS. No. 103597-45-1), 3-[3-tert-butyl-5-(5-chloro-2H-benzotriazole-2-yl)-4-hydroxylphenyl]propionic acid octyl (CAS. No. 83044-89-7), 2-ethylhexyl 3-[3-tert-butyl-5-(5-chlorobenzotriazol-2-yl)-4-hydroxyphenyl]propanoate (CAS. No. 83044-90-0) and the like. It is preferred that the ultraviolet ray screening agent be a benzotriazole-based ultraviolet ray screening agent containing a halogen atom, and it is more preferred that the ultraviolet ray screening agent be a benzotriazole-based ultraviolet ray screening agent containing a chlorine atom, since those are excellent in ultraviolet ray absorbing performance.

Examples of the benzophenone-based ultraviolet ray screening agent include octabenzone ("Chimassorb 81" available from BASF Japan Ltd.), and the like.

Examples of the triazine-based ultraviolet ray screening agent include "LA-F70" available from ADEKA CORPORATION and 2-(4,6-diphenyl-1,3,5-triazine-2-yl)-5-[(hexyl)oxy]-phenol ("Tinuvin 1577FF" available from BASF Japan Ltd.), and the like.

Examples of the malonic acid ester-based ultraviolet ray screening agent include dimethyl 2-(p-methoxybenzylidene)malonate, tetraethyl-1,2-(1,4-phenylenedimethylidene)bis-malonate, 2-(p-methoxybenzylidene)-bis(1,2,2,6,6-pentamethyl-4-piperidinyl)malonate, and the like.

Examples of a commercial product of the malonic acid ester-based ultraviolet ray screening agent include Hostavin B-CAP, Hostavin PR-25 and Hostavin PR-31 (any of these is available from Clariant Japan K.K.).

Examples of the oxanilide-based ultraviolet ray screening agent include a kind of oxalic acid diamide having a substituted aryl group and the like on the nitrogen atom such as N-(2-ethylphenyl)-N'-(2-ethoxy-5-t-butylphenyl)oxalilc acid diamide, N-(2-ethylphenyl)-N'-(2-ethoxy-phenyl)oxalic acid diamide and 2-ethyl-2'-ethoxy-oxanilide ("Sanduvor VSU" available from Clariant Japan K.K.).

Examples of the benzoate-based ultraviolet ray screening agent include 2,4-di-tert-butylphenyl-3,5-di-tert-butyl-4-hydroxybenzoate ("Tinuvin 120" available from BASF Japan Ltd.), and the like.

It is preferred that the ultraviolet ray screening agent be an ultraviolet ray screening agent having a largest absorption wavelength of 340 nm or more and 365 nm or less in the wavelength range of 315 nm or more and 380 nm or less, and it is more preferred that the ultraviolet ray screening agent be a benzotriazole-based ultraviolet ray screening agent having a largest absorption wavelength of 340 nm or more and 365 nm or less in the wavelength range of 315 nm or more and 380 nm or less.

If an ultraviolet ray absorber having an absorption wavelength within the wavelength range of 315 nm or more and 380 nm or less is used, bad influence on a human body can be reduced when irradiated with a ray of light through a sheet of laminated glass and the deterioration of the interlayer film can be suppressed. On the other hand, when an ultraviolet ray screening agent having a largest absorption wavelength of 340 nm or more and 365 nm or less in the wavelength range of 315 nm or more and 380 nm or less is used and heat shielding particles are not used, there is a tendency for the YI value to be increased. In contrast, by using an ultraviolet ray screening agent having a largest absorption wavelength of 340 nm or more and 365 nm or less in the wavelength range of 315 nm or more and 380 nm or less and tungsten oxide particles together, an increase in the YI value can be effectively suppressed.

From the viewpoint of further suppressing the lowering in visible light transmittance after the lapse of a certain period of time, in 100% by weight of a layer containing the ultraviolet ray screening agent (a first layer, a second layer or a third layer), each of the content of the ultraviolet ray screening agent and the content of a benzotriazole compound is preferably 0.1% by weight or more, more preferably 0.2% by weight or more, further preferably 0.3% by weight or more, especially preferably 0.5% by weight or more, preferably 2.5% by weight or less, more preferably 2% by weight or less, further preferably 1% by weight or less and especially preferably 0.8% by weight or less. In particular, by setting the content, of the ultraviolet ray screening agent to be 0.2% by weight or more in 100% by weight of a layer containing the ultraviolet ray screening agent, with regard to the interlayer film and laminated glass, the lowering in visible light transmittance thereof after the lapse of a certain period of time can be significantly suppressed.

(Oxidation Inhibitor)

It is preferred that the interlayer film include an oxidation inhibitor. It is preferred that the first layer contain an oxidation inhibitor. It is preferred that the second layer contain an oxidation inhibitor. It is preferred that the third layer contain an oxidation inhibitor. One kind of the oxidation inhibitor may be used alone, and two or more kinds thereof may be combinedly used.

Examples of the oxidation inhibitor include a phenol-based oxidation inhibitor, a sulfur-based oxidation inhibitor, a phosphorus-based oxidation inhibitor, and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

It is preferred that the oxidation inhibitor be a phenol-based oxidation inhibitor or a phosphorus-based oxidation inhibitor.

Examples of the phenol-based oxidation inhibitor include 2,6-di-t-butyl-p-cresol (BHT), butylated hydroxyanisole (BHA), 2,6-di-t-butyl-4-ethylphenol, stearyl β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenyl), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3,5-trimethyl-2,4,6-tris(3,5-di-t-butyl-4-hydroxybenzyl)benzene, bis(3,3'-t-butylphenol)butyric acid glycol ester, bis(3-t-butyl-4-hydroxy-5-methylbenzenepropanoic acid)ethylenebis(oxyethylene), and the like. One kind or two or more kinds among these oxidation inhibitors are suitably used.

Examples of the phosphorus-based oxidation inhibitor include tridecyl phosphite, tris(tridecyl) phosphite, triphenyl phosphite, trinonylphenyl phosphite, bis(tridecyl)pentaerithritol diphosphite, bis(decyl)pentaerithritol diphosphite, tris(2,4-di-t-butylphenyl) phosphite, bis(2,4-di-t-butyl-6-methylphenyl)ethyl ester phosphorous acid, tris(2,4-di-t-butylphenyl) phosphite, 2,2'-methylenebis(4,6-di-t-butyl-1-phenyloxy) (2-ethylhexyloxy)phosphorus, and the like. One kind or two or more kinds among these oxidation inhibitors are suitably used.

Examples of a commercial product of the oxidation inhibitor include "IRGANOX 245" available from BASF Japan Ltd., "IRGAFOS 168" available from BASF Japan Ltd., "IRGAFOS 38" available from BASF Japan Ltd., "Sumilizer BHT" available from Sumitomo Chemical Co., Ltd., "IRGANOX 1010" available from BASF Japan Ltd., and the like.

With regard to the interlayer film and laminated glass, in order to maintain high visible light transmittance thereof over a long period of time, it is preferred that the content of the oxidation inhibitor be 0.1% by weight or more in 100% by weight of the interlayer film or in 100% by weight of the layer containing the oxidation inhibitor (a first layer, a second layer or a third layer). Moreover, since an effect commensurate with the addition of an oxidation inhibitor is not attained, it is preferred that the content of the oxidation inhibitor be 2% by weight or less in 100% by weight of the interlayer film or in 100% by weight of the layer containing the oxidation inhibitor.

(Other Ingredients)

Each of the first layer, the second layer and the third layer may include additives such as a flame retardant, an antistatic agent, a pigment, a dye, a moisture-resistance improving agent, a fluorescent brightening agent and an infrared ray absorber, as necessary. One kind of these additives may be used alone, and two or more kinds thereof may be combinedly used.

(Laminated Glass)

FIG. 8 shows an example of laminated glass prepared with an interlayer film for laminated glass in accordance with one embodiment of the present invention represented as a sectional view.

The laminated glass 21 shown in FIG. 8 is provided with an interlayer film 11, a first laminated glass member 22 and a second laminated glass member 23. The interlayer film 11 is arranged between the first laminated glass member 22 and the second laminated glass member 23 to be sandwiched therebetween. The first laminated glass member 22 is arranged on a first surface of the interlayer film 11. The second laminated glass member 23 is arranged on a second surface opposite to the first surface of the interlayer film 11.

Examples of the laminated glass member include a glass plate, a PET (polyethylene terephthalate) film, and the like. As the laminated glass, laminated glass in which an interlayer film is sandwiched between a glass plate and a PST film or the like, as well as laminated glass in which an interlayer film is sandwiched between two glass plates, is included. Laminated glass is a laminate provided with a glass plate, and it is preferred that at least one glass plate be used. It is preferred that each of the first laminated glass member and the second laminated glass member be a glass plate or a PET (polyethylene terephthalate) film and the interlayer film include at least one glass plate as the first laminated glass member or the second laminated glass member. It is especially preferred that both of the first laminated glass member and the second laminated glass member be glass plates.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, net-reinforced plate glass, wired plate glass, green glass, and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth)acrylate plate, and the like.

Although respective thicknesses of the first laminated glass member and the second laminated glass member are not particularly limited, the thickness is preferably 1 mm or more and preferably 5 mm or less. When the laminated glass member is a glass plate, the thickness of the glass plate is preferably 1 mm or more and preferably 5 mm or less. When the laminated glass member is a PET film, the thickness of the PET film is preferably 0.03 mm or more and preferably 0.5 mm or less.

The production method of the laminated glass is not particularly limited. For example, the interlayer film is sandwiched between the first and the second components for laminated glass, and then, passed through pressure rolls or subjected to decompression suction in a rubber bag, so that the air remaining between the first and the second components for laminated glass and the interlayer film is removed. Afterward, the members are preliminarily bonded together at about 70 to 110° C. to obtain a laminate. Next, by putting the laminate into an autoclave or by pressing the laminate, the members are press-bonded together at about 120 to 150° C. and under a pressure of 1 to 1.5 MPa. In this way, laminated glass can be obtained.

The laminated glass can be used for automobiles, railway vehicles, aircraft, ships, buildings and the like. It is preferred that the laminated glass be laminated glass for building or for vehicles, and it is more preferred that the laminated glass be laminated glass for vehicles. The laminated glass can also be used for applications other than these applications. The laminated glass can be used for a windshield, side glass, rear glass or roof glass of an automobile, and the like. Since the laminated glass is high in heat shielding properties and is high in visible light transmittance, the laminated glass is suitably used for automobiles.

Since the laminated glass prepared with the interlayer film enables double images to be suppressed, the laminated glass can be suitably used for a windshield of an automobile. It is preferred that the interlayer film be used for laminated glass constituting a head-up display (HUD). It is preferred that the laminated glass constitute a head-up display (HUD).

In the laminated glass, measured information such as the speed which is sent from a control unit and the like can be emitted from a display unit of the instrumental panel to be projected onto the windshield. As such, without making a driver of an automobile move his or her visual field downward, a front visual field and measured information can be visually observed simultaneously.

Hereinafter, the present invention will be described in more detail with reference to examples. The present invention is not limited only to these examples.

The following materials were used in examples and comparative examples.

Thermoplastic Resin:

PVB1 (a polyvinyl butyral resin acetalized with n-butyraldehyde, the average polymerization degree of 1700, the content of the hydroxyl group of 30.8% by mole, the acetylation degree of 0.7% by mole, the butyralization degree of 68.5% by mole)

In this connection, the content of the hydroxyl group, the acetylation degree and the butyralization degree (the acetalization degree) of the above-mentioned polyvinyl butyral were measured by a method in accordance with ASTM D1396-92. In this connection, even in the cases of being measured according to JIS K6728 "Testing methods for polyvinyl butyral", numerical values similar to those obtained by a method in accordance with ASTM D1396-92 were exhibited.

Plasticizer:

3GO (triethylene glycol di-2-ethylhexanoate)

Heat Shielding Compound:

ITO (ITO particles, tin-doped indium oxide particles)

CWO (CWO particles, cesium-doped tungsten oxide ($Cs_{0.33}WO_3$) particles)

Ultraviolet Ray Screening Agent:

Tinuvin 326 (2-(2'-hydroxy-3'-t-butyl-5-methylphenyl)-5-chlorobenzotriazole, "Tinuvin 326" available from BASF Japan Ltd.) (the largest absorption wavelength of 352.5 nm)

PR-25 (propanedioic acid [(4-methoxyphenyl)-methylene]-dimethyl ester, "Hostavin PR-25" available from Clariant Japan K.K.) (the largest absorption wavelength of 315 nm)

3-(5-chloro-2H-benzotriazol-2-yl)-5-(1,1-dimethylethyl)-4-hydroxyphenylpropionic acid methyl ester (CAS. No. 83044-91-1) (the largest absorption wavelength of 352.5 nm)

4-(benzotriazol-2-yl)benzene-1,3-diol (CAS. No. 22607-31-4) (the largest absorption wavelength of 345 nm)

2-(2H-benzotriazol-2-yl)-5-butoxy-phenol (CAS. No. 197251-58-4) (the largest absorption wavelength of 345 nm)

"Tinuvin 327" available from BASF Japan Ltd. (CAS. No. 3864-99-1 (the largest absorption wavelength of 350 nm)

2-(2H-benzotriazol-2-yl)-5-(octyloxy)-phenol (CAS. No. 3147-77-1) (the largest absorption wavelength of 345 nm)

2-(2H-benzotriazol-2-yl)-4-(1,1-dimethylethyl)-6-(1-methylpropyl)phenol (CAS. No. 36437-37-3) (the largest absorption wavelength of 342.5 nm)

2,2'-methylenebis[6-(benzotriazol-2-yl)-4-tert-octylphenyl] (CAS. No. 103597-45-1) (the largest absorption wavelength of 350 nm)

3-[3-tert-butyl-5-(5-chloro-2H-benzotriazol-2-yl)-4-hydroxyphenyl]propionic acid octyl ester (CAS. No. 83044-89-7) (the largest absorption wavelength of 350 nm)

2-ethylhexyl 3-[3-tert-butyl-5-(5-chlorobenzotriazol-2-yl)-4-hydroxyphenyl]propanoate (CAS. No. 83044-90-0) (the largest absorption wavelength of 350 nm)

In the column of the Ultraviolet ray screening agent mentioned above, a wavelength exhibiting the largest absorption (the largest absorption wavelength) in the wavelength region of 315 nm or more and 380 nm or less is shown.

Oxidation Inhibitor:

BHT (2,6-di-t-butyl-p-cresol)

Example 1

Preparation of Composition 1 for Forming Interlayer Film

To 100 parts by weight of a polyvinyl butyral resin (PVB1), 40 parts by weight of triethylene glycol di-2-ethylhexanoate (3GO), tungsten oxide particles (CWO) in an amount that the content thereof in the resulting first layer becomes 0.005% by weight, Tinuvin 326 (2-(2'-hydroxy-3'-t-butyl-5-methylphenyl)-5-chlorobenzotriazole, "Tinuvin 326" available from BASF Japan Ltd.) in an amount that the content thereof in the resulting first layer becomes 0.6% by weight and BHT (2,6-di-t-butyl-p-cresol) in an amount that the content thereof in the resulting first layer becomes 0.2% by weight were added and thoroughly kneaded with a mixing roll to obtain a Composition 1 for forming an interlayer film.

Preparation of Interlayer Film

The Composition 1 obtained was extruded using an extruder to prepare an interlayer film (first layer) having a wedge-like sectional shape in the thickness direction.

In the interlayer film obtained, the thickness of one end in the longitudinal direction was made to be thinner than the thickness of the other end at the opposite side of the one end, the thickness in the transversal direction was made to be uniform, and the maximum thickness and minimum thickness of the first layer and the wedge angle θ of the interlayer film were set to those listed in the following Table 1. The sectional shape in the thickness direction of the interlayer film obtained was determined to be a wedge-like shape, and the interlayer film was determined to have a shape in which the thickness is gradually thickened from one end toward the other end. The interlayer film was determined to have a minimum thickness at one end and have a maximum thickness at the other end.

Preparation of Laminated Glass

The interlayer film obtained was cut into a size of (1000 mm in longitudinal length×300 mm in transversal length) so that the center portion in the longitudinal direction and the transversal direction would be removed. Next, between two sheets of transparent float glass (1000 mm in longitudinal length×300 mm in transversal length×2.5 mm in thickness), the interlayer film was sandwiched to obtain a laminate. The laminate was put into a rubber bag and degassed for 20 minutes at a degree of vacuum of 2.6 kPa, after which the laminate was transferred into an oven while being degassed, and furthermore, held in place for 30 minutes at 90° C. and pressed under vacuum to subject the laminate to preliminary press-bonding. The preliminarily press-bonded laminate was subjected to press-bonding for 20 minutes under conditions of 135° C. and a pressure of 1.2 MPa in an autoclave to obtain a sheet of laminated glass.

Examples 2 to 48, Reference Examples a to C and Comparative Examples 1, 2

A sheet of laminated glass was obtained in the same manner as that in Example 1 except that the kind of ingredients to be blended, which are contained in the first layer and the blending amount thereof, and the shape of the interlayer film were set to those listed in the following Tables 1 to 3. In this connection, the kind of ingredients to be blended excluding the tungsten oxide particles and the ultraviolet ray screening agent and the blending amount thereof were set in the same manner as that in Example 1.

(Evaluation)

(1) YI Value Measured at End Part of Sheet of Laminated Glass

Using a spectrophotometer ("U-4100" available from Hitachi, Ltd.), the laminated glass was measured for the transmittance at 300 to 2500 nm. The YI in the C light XYZ colorimetric system was calculated in accordance with JIS K 7373.

In this connection, the sheet of laminated glass was measured for the YI value at a point (thin part) positioned at a distance of 0.1X from one end being thin in thickness of the interlayer film toward the inside and the YI value at a point (thick part) positioned at a distance of 0.1X from the other end being thick in thickness of the interlayer film toward the inside.

(2) Excitation Purity

Using a spectrophotometer ("U-4100" available from Hitachi, Ltd.), the laminated glass was measured for the transmittance at 300 to 2500 nm. The excitation purity in the C light XYZ colorimetric system was calculated in accordance with JIS Z8701 (1999).

In this connection, the sheet of laminated glass was measured for the excitation purity at a point (thin part) positioned at a distance of 0.1X from one end being thin in thickness of the interlayer film toward the inside and the excitation purity at a point (thick part) positioned at a distance of 0.1X from the other end being thick in thickness of the interlayer film toward the inside.

(3) Double Images

The sheet of laminated glass was installed at a position of the windshield. The information to be displayed, which is emitted from a display unit installed below the sheet of laminated glass, was reflected in the sheet of laminated glass to visually confirm the presence or absence of double images at a prescribed position. The double images were judged according to the following criteria.

[Criteria for Judgment in Double Images]

◯: Double images are not confirmed.

x: Double images are confirmed.

The results are shown in the following Tables 1 to 3. In the following Tables 1 to 3, with regard to the kind of ingredients to be blended excluding the tungsten oxide particles and the ultraviolet ray screening agent and the blending amount thereof, the description therefor was omitted. In this connection, the interlayer films in all of the examples were determined to be excellent in heat shielding properties since a heat shielding compound is included therein. In Reference Examples A to C, the heat shielding properties are considerably low because a heat shielding compound is not used.

TABLE 1

| | | Constitution of interlayer film (first layer) | | | | | |
|---|---|---|---|---|---|---|---|
| | | Wedge angle ° | Maximum thickness mm | Minimum thickness mm | Kind of ultraviolet ray screening agent | Content of ultraviolet ray screening agent wt % | Kind of heat shielding compound | Content of heat shielding compound wt % |
| Example | 1 | 0.5 | 1.27 | 0.76 | Tinuvin326 | 0.6 | CWO | 0.005 |
| Example | 2 | 0.95 | 1.73 | 0.76 | Tinuvin326 | 0.6 | CWO | 0.005 |
| Example | 3 | 1.85 | 2.64 | 0.76 | Tinuvin326 | 0.6 | CWO | 0.005 |
| Example | 4 | 0.5 | 1.27 | 0.76 | Tinuvin326 | 0.6 | CWO | 0.01 |
| Example | 5 | 0.95 | 1.73 | 0.76 | Tinuvin326 | 0.6 | CWO | 0.01 |
| Example | 6 | 1.85 | 2.64 | 0.76 | Tinuvin326 | 0.6 | CWO | 0.01 |
| Example | 7 | 0.5 | 1.27 | 0.76 | Tinuvin326 | 0.6 | CWO | 0.02 |
| Example | 8 | 0.95 | 1.73 | 0.76 | Tinuvin326 | 0.6 | CWO | 0.02 |
| Example | 9 | 1.85 | 2.64 | 0.76 | Tinuvin326 | 0.6 | CWO | 0.02 |
| Example | 10 | 0.5 | 1.27 | 0.76 | Tinuvin326 | 0.6 | CWO | 0.03 |
| Example | 11 | 0.95 | 1.73 | 0.76 | Tinuvin326 | 0.6 | CWO | 0.03 |
| Example | 12 | 1.85 | 2.64 | 0.76 | Tinuvin326 | 0.6 | CWO | 0.03 |
| Example | 13 | 0.5 | 1.27 | 0.76 | Tinuvin326 | 0.6 | CWO | 0.06 |
| Example | 14 | 0.95 | 1.73 | 0.76 | Tinuvin326 | 0.6 | CWO | 0.06 |
| Example | 15 | 1.85 | 2.64 | 0.76 | Tinuvin326 | 0.6 | CWO | 0.06 |
| Example | 16 | 0.5 | 1.27 | 0.76 | Tinuvin326 | 0.6 | CWO | 0.09 |
| Example | 17 | 0.95 | 1.73 | 0.76 | Tinuvin326 | 0.6 | CWO | 0.09 |
| Example | 18 | 1.85 | 2.64 | 0.76 | Tinuvin326 | 0.6 | CWO | 0.09 |
| Example | 19 | 0.5 | 1.27 | 0.76 | Tinuvin326 | 0.6 | CWO | 0.10 |
| Example | 20 | 0.95 | 1.73 | 0.76 | Tinuvin326 | 0.6 | CWO | 0.10 |
| Example | 21 | 1.85 | 2.64 | 0.76 | Tinuvin326 | 0.6 | CWO | 0.10 |
| Reference Example | A | 0.5 | 1.27 | 0.76 | Tinuvin326 | 0.6 | — | — |
| Reference Example | B | 0.95 | 1.73 | 0.76 | Tinuvin326 | 0.6 | — | — |

TABLE 1-continued

| | | | | | | | | |
|---|---|---|---|---|---|---|---|---|
| Reference Example | C | 1.85 | 2.64 | 0.76 | Tinuvin326 | 0.6 | — | — |
| Comparative Example | 1 | 1.85 | 2.64 | 0.76 | Tinuvin326 | 0.6 | ITO | 0.10 |
| Comparative Example | 2 | 1.85 | 2.64 | 0.76 | PR-25 | 0.6 | CWO | 0.10 |

| | | Evaluation | | | | | | |
|---|---|---|---|---|---|---|---|---|
| | | YI value | | | Excitation purity | | | |
| | | Thin part | Thick part | Absolute value of difference | Thin part | Thick part | Absolute value of difference | Double images |
| Example | 1 | 2.3 | 2.9 | 0.6 | 1.4 | 1.8 | 0.3 | ○ |
| Example | 2 | 2.4 | 3.3 | 1.0 | 1.5 | 2.1 | 0.6 | ○ |
| Example | 3 | 2.5 | 4.1 | 1.6 | 1.6 | 2.6 | 1.0 | ○ |
| Example | 4 | 2.2 | 2.7 | 0.5 | 1.4 | 1.8 | 0.3 | ○ |
| Example | 5 | 2.3 | 3.2 | 0.9 | 1.5 | 2.1 | 0.6 | ○ |
| Example | 6 | 2.4 | 3.9 | 1.4 | 1.6 | 2.5 | 1.0 | ○ |
| Example | 7 | 2.1 | 2.5 | 0.4 | 1.4 | 1.7 | 0.3 | ○ |
| Example | 8 | 2.1 | 2.8 | 0.7 | 1.4 | 2.0 | 0.5 | ○ |
| Example | 9 | 2.2 | 3.3 | 1.1 | 1.5 | 2.4 | 0.9 | ○ |
| Example | 10 | 1.9 | 2.3 | 0.3 | 1.4 | 1.7 | 0.3 | ○ |
| Example | 11 | 2.0 | 2.5 | 0.5 | 1.4 | 1.9 | 0.5 | ○ |
| Example | 12 | 2.1 | 2.8 | 0.7 | 1.5 | 2.3 | 0.8 | ○ |
| Example | 13 | 1.5 | 1.5 | 0.0 | 1.3 | 1.6 | 0.3 | ○ |
| Example | 14 | 1.5 | 1.5 | 0.0 | 1.4 | 1.8 | 0.4 | ○ |
| Example | 15 | 1.5 | 1.2 | 0.3 | 1.4 | 2.1 | 0.7 | ○ |
| Example | 16 | 1.0 | 0.8 | 0.2 | 1.3 | 1.6 | 0.2 | ○ |
| Example | 17 | 1.0 | 0.5 | 0.5 | 1.4 | 1.8 | 0.5 | ○ |
| Example | 18 | 1.0 | −0.4 | 1.3 | 1.4 | 2.3 | 0.9 | ○ |
| Example | 19 | 0.9 | 0.5 | 0.3 | 1.3 | 1.6 | 0.3 | ○ |
| Example | 20 | 0.8 | 0.1 | 0.7 | 1.4 | 1.9 | 0.5 | ○ |
| Example | 21 | 0.8 | −0.9 | 1.7 | 1.4 | 2.5 | 1.1 | ○ |
| Reference Example | A | 2.4 | 3.0 | 0.6 | 1.4 | 1.8 | 0.3 | ○ |
| Reference Example | B | 2.5 | 3.5 | 1.0 | 1.5 | 2.1 | 0.6 | ○ |
| Reference Example | C | 2.6 | 4.4 | 1.8 | 1.6 | 2.7 | 1.1 | ○ |
| Comparative Example | 1 | 2.8 | 4.6 | 1.8 | 1.7 | 2.9 | 1.2 | ○ |
| Comparative Example | 2 | −0.5 | −2.9 | 2.4 | 1.1 | 2.6 | 1.5 | ○ |

TABLE 2

| | | | | | Constitution of interlayer film (first layer) | | | |
|---|---|---|---|---|---|---|---|---|
| | | Wedge angle ° | Maximum thickness mm | Minimum thickness mm | Kind of ultraviolet ray screening agent | Content of ultraviolet ray screening agent wt % | Kind of heat shielding compound | Content of heat shielding compound wt % |
| Example | 22 | 0.5 | 1.27 | 0.76 | 3-(5-chloro-2H-benzotriazol-2-yl)-5-(1,1-dimethylethyl)-4-hydroxyphenylpropionic acid methyl ester | 83044-91-1 | 0.6 | CWO | 0.06 |
| Example | 23 | 0.95 | 1.73 | 0.76 | 3-(5-chloro-2H-benzotriazol-2-yl)-5-(1,1-dimethylethyl)-4-hydroxyphenylpropionic acid methyl ester | 83044-91-1 | 0.6 | CWO | 0.06 |
| Example | 24 | 1.85 | 2.64 | 0.76 | 3-(5-chloro-2H-benzotriazol-2-yl)-5-(1,1-dimethylethyl)-4-hydroxyphenylpropionic acid methyl ester | 83044-91-1 | 0.6 | CWO | 0.06 |
| Example | 25 | 0.5 | 1.27 | 0.76 | 4-(benzotriazol-2-yl)benzene-1,3-diol | 22607-31-4 | 0.6 | CWO | 0.06 |
| Example | 26 | 0.95 | 1.73 | 0.76 | 4-(benzotriazol-2-yl)benzene-1,3-diol | 22607-31-4 | 0.6 | CWO | 0.06 |

TABLE 2-continued

| | | | | | | | | | |
|---|---|---|---|---|---|---|---|---|---|
| Example | 27 | 1.85 | 2.64 | 0.76 | 4-(benzotriazol-2-yl)benzene-1,3-diol | 22607-31-4 | 0.6 | CWO | 0.06 |
| Example | 28 | 0.5 | 1.27 | 0.76 | 2-(2H-benzotriazol-2-yl)-5-butoxy-phenol | 197251-58-4 | 0.6 | CWO | 0.06 |
| Example | 29 | 0.95 | 1.73 | 0.76 | 2-(2H-benzotriazol-2-yl)-5-butoxy-phenol | 197251-58-4 | 0.6 | CWO | 0.06 |
| Example | 30 | 1.85 | 2.64 | 0.76 | 2-(2H-benzotriazol-2-yl)-5-butoxy-phenol | 197251-58-4 | 0.6 | CWO | 0.06 |
| Example | 31 | 0.5 | 1.27 | 0.76 | Tinuvin327 | 3864-99-1 | 0.6 | CWO | 0.06 |
| Example | 32 | 0.95 | 1.73 | 0.76 | Tinuvin327 | 3864-99-1 | 0.6 | CWO | 0.06 |
| Example | 33 | 1.85 | 2.64 | 0.76 | Tinuvin327 | 3864-99-1 | 0.6 | CWO | 0.06 |
| Example | 34 | 0.5 | 1.27 | 0.76 | 2-(2H-benzotriazol-2-yl)-5-(octyloxy)-phenol | 3147-77-1 | 0.6 | CWO | 0.06 |
| Example | 35 | 0.95 | 1.73 | 0.76 | 2-(2H-benzotriazol-2-yl)-5-(octyloxy)-phenol | 3147-77-1 | 0.6 | CWO | 0.06 |
| Example | 36 | 1.85 | 2.64 | 0.76 | 2-(2H-benzotriazol-2-yl)-5-(octyloxy)-phenol | 3147-77-1 | 0.6 | CWO | 0.06 |

| | | Evaluation | | | | | | |
|---|---|---|---|---|---|---|---|---|
| | | YI value | | | Excitation purity | | | |
| | | Thin part | Thick part | Absolute value of difference | Thin part | Thick part | Absolute value of difference | Double images |
| Example | 22 | 1.4 | 1.4 | 0 | 1.2 | 1.6 | 0.4 | ○ |
| Example | 23 | 1.4 | 1.4 | 0 | 1.3 | 1.8 | 0.5 | ○ |
| Example | 24 | 1.4 | 1.2 | 0.2 | 1.3 | 2.2 | 0.9 | ○ |
| Example | 25 | 0.2 | 0.1 | 0.1 | 0.9 | 1.4 | 0.5 | ○ |
| Example | 26 | 0.2 | −0.2 | 0.4 | 0.9 | 1.6 | 0.7 | ○ |
| Example | 27 | 0.2 | −0.5 | 0.7 | 1 | 2 | 1 | ○ |
| Example | 28 | 0.4 | 0.4 | 0 | 1.1 | 1.5 | 0.4 | ○ |
| Example | 29 | 0.4 | 0.2 | 0.2 | 1.1 | 1.7 | 0.6 | ○ |
| Example | 30 | 0.4 | −0.1 | 0.5 | 1.2 | 2.2 | 1 | ○ |
| Example | 31 | 1.5 | 1.5 | 0 | 1.3 | 1.6 | 0.3 | ○ |
| Example | 32 | 1.5 | 1.5 | 0 | 1.4 | 1.8 | 0.4 | ○ |
| Example | 33 | 1.5 | 1.2 | 0.3 | 1.4 | 2.1 | 0.7 | ○ |
| Example | 34 | 0.5 | 0.5 | 0 | 1.1 | 1.5 | 0.4 | ○ |
| Example | 35 | 0.5 | 0.4 | 0.1 | 1.2 | 1.7 | 0.5 | ○ |
| Example | 36 | 0.5 | 0.1 | 0.4 | 1.2 | 2.1 | 0.9 | ○ |

TABLE 3

| | | Constitution of interlayer film (first layer) | | | | | | |
|---|---|---|---|---|---|---|---|---|
| | | Wedge angle ° | Maximum thickness mm | Minimum thickness mm | Kind of ultraviolet ray screening agent | | Content of ultraviolet ray screening agent wt % | Kind of heat shielding compound | Content of heat shielding compound wt % |
| Example | 37 | 0.5 | 1.27 | 0.76 | 2-(2H-benzotriazol-2-yl)-4-(1,1-dimethylethyl)-6-(1-methylpropyl)phenol | 36437-37-3 | 0.6 | CWO | 0.06 |
| Example | 38 | 0.95 | 1.73 | 0.76 | 2-(2H-benzotriazol-2-yl)-4-(1,1-dimethylethyl)-6-(1-methylpropyl)phenol | 36437-37-3 | 0.6 | CWO | 0.06 |
| Example | 39 | 1.85 | 2.64 | 0.76 | 2-(2H-benzotriazol-2-yl)-4-(1,1-dimethylethyl)-6-(1-methylpropyl)phenol | 36437-37-3 | 0.6 | CWO | 0.06 |
| Example | 40 | 0.5 | 1.27 | 0.76 | 2,2'-methylenebis[6-(benzotriazol-2-yl)-4-tert-octylphenol] | 103597-45-1 | 0.6 | CWO | 0.06 |
| Example | 41 | 0.95 | 1.73 | 0.76 | 2,2'-methylenebis[6-(benzotriazol-2-yl)-4-tert-octylphenol] | 103597-45-1 | 0.6 | CWO | 0.06 |
| Example | 42 | 1.85 | 2.64 | 0.76 | 2,2'-methylenebis[6-(benzotriazol-2-yl)-4-tert-octylphenol] | 103597-45-1 | 0.6 | CWO | 0.06 |
| Example | 43 | 0.5 | 1.27 | 0.76 | 3-[3-tert-butyl-5-(5-chloro-2H-benzotriazol-2-yl)-4-hydroxyphenyl]propionic acid octyl ester | 83044-89-7 | 0.6 | CWO | 0.06 |

TABLE 3-continued

| | | | | | | | | | |
|---|---|---|---|---|---|---|---|---|---|
| Example | 44 | 0.95 | 1.73 | 0.76 | 3-[3-tert-butyl-5-(5-chloro-2H-benzotriazol-2-yl)-4-hydroxyphenyl]propionic acid octyl ester | 83044-89-7 | 0.6 | CWO | 0.06 |
| Example | 45 | 1.85 | 2.64 | 0.76 | 3-[3-tert-butyl-5-(5-chloro-2H-benzotriazol-2-yl)-4-hydroxyphenyl]propionic acid octyl ester | 83044-89-7 | 0.6 | CWO | 0.06 |
| Example | 46 | 0.5 | 1.27 | 0.76 | 2-ethylhexyl 3-[3-tert-butyl-5-(5-chlorobenzotriazol-2-yl)-4-hydroxyphenyl]propanoate | 83044-90-0 | 0.6 | CWO | 0.06 |
| Example | 47 | 0.95 | 1.73 | 0.76 | 2-ethylhexyl 3-[3-tert-butyl-5-(5-chlorobenzotriazol-2-yl)-4-hydroxyphenyl]propanoate | 83044-90-0 | 0.6 | CWO | 0.06 |
| Example | 48 | 1.85 | 2.64 | 0.76 | 2-ethylhexyl 3-[3-tert-butyl-5-(5-chlorobenzotriazol-2-yl)-4-hydroxyphenyl]propanoate | 83044-90-0 | 0.6 | CWO | 0.06 |

| | | Evaluation | | | | | | |
|---|---|---|---|---|---|---|---|---|
| | | YI value | | | Excitation purity | | | |
| | | Thin part | Thick part | Absolute value of difference | Thin part | Thick part | Absolute value of difference | Double images |
| Example | 37 | 1.6 | 1.6 | 0 | 1.4 | 1.7 | 0.3 | ○ |
| Example | 38 | 1.6 | 1.6 | 0 | 1.4 | 1.8 | 0.4 | ○ |
| Example | 39 | 1.6 | 1.4 | 0.2 | 1.5 | 2.1 | 0.6 | ○ |
| Example | 40 | 1.2 | 1.2 | 0 | 1.2 | 1.6 | 0.4 | ○ |
| Example | 41 | 1.2 | 1.1 | 0.1 | 1.2 | 1.8 | 0.6 | ○ |
| Example | 42 | 1.2 | 0.9 | 0.3 | 1.3 | 2.2 | 0.9 | ○ |
| Example | 43 | 1.4 | 1.4 | 0 | 1.2 | 1.6 | 0.4 | ○ |
| Example | 44 | 1.4 | 1.3 | 0.1 | 1.3 | 1.8 | 0.5 | ○ |
| Example | 45 | 1.4 | 1.2 | 0.2 | 1.3 | 2.2 | 0.9 | ○ |
| Example | 46 | 1.3 | 1.3 | 0 | 1.2 | 1.6 | 0.4 | ○ |
| Example | 47 | 1.3 | 1.2 | 0.1 | 1.2 | 1.8 | 0.6 | ○ |
| Example | 48 | 1.3 | 1 | 0.3 | 1.3 | 2.3 | 1 | ○ |

EXPLANATION OF SYMBOLS 1, 1A, 1B, 1C, 1D, 1E, 1F: First layer
2, 2B, 2C, 2D, 2E, 2F: Second layer
2Fa: Portion in which the sectional shape in the thickness direction is a rectangular shape
2Fb: Portion in which the sectional shape in the thickness direction is a wedge-like shape
3, 3B, 3C, 3D: Third layer
11, 11A, 11B, 11C, 11D, 11E, 11F: Interlayer film
11a: One end
11b: The other end
21: Laminated glass
22: Laminated glass member
23: Laminated glass member

The invention claimed is:

1. An interlayer film for laminated glass having a thickness of one end thinner than a thickness of the other end at the opposite side of the one end and including a thermoplastic resin, an ultraviolet ray screening agent and tungsten oxide particles,
the ultraviolet ray screening agent being a benzotriazole-based ultraviolet ray screening agent, and
when the distance between the one end and the other end of the interlayer film is defined as X, the absolute value of the difference between the excitation purity at a point positioned at a distance of 0.1X from the other end toward the inside and the excitation purity at a point positioned at a distance of 0.1X from the one end toward the inside being 1 or less.

2. The interlayer film for laminated glass according to claim 1, wherein, when the distance between the one end and the other end of the interlayer film is defined as X, the excitation purity at a point positioned at a distance of 0.1X from the other end toward the inside is 2.6 or less.

3. The interlayer film for laminated glass according to claim 1, further having a portion in which the sectional shape in the thickness direction is a wedge-like shape.

4. Laminated glass, comprising:
a first laminated glass member;
a second laminated glass member; and
the interlayer film for laminated glass according to claim 1,
the interlayer film for laminated glass being arranged between the first laminated glass member and the second laminated glass member.

* * * * *